(12) United States Patent
Ieraci

(10) Patent No.: US 11,707,150 B2
(45) Date of Patent: Jul. 25, 2023

(54) WINDOW PLANTER INCLUDING SLIDABLE COMPARTMENTS

(71) Applicant: Bruno Ieraci, Haines Falls, NY (US)

(72) Inventor: Bruno Ieraci, Haines Falls, NY (US)

(*) Notice: Subject to any disclaimer, the term of this patent is extended or adjusted under 35 U.S.C. 154(b) by 234 days.

(21) Appl. No.: 17/323,376

(22) Filed: May 18, 2021

(65) Prior Publication Data

US 2022/0079369 A1 Mar. 17, 2022

Related U.S. Application Data

(63) Continuation-in-part of application No. 17/018,010, filed on Sep. 11, 2020, now Pat. No. 11,006,583.

(51) Int. Cl.
| | |
|---|---|
| *A01G 9/02* | (2018.01) |
| *A47H 27/00* | (2006.01) |
| *A01G 9/12* | (2006.01) |
| *H02S 40/38* | (2014.01) |
| *A47G 33/00* | (2006.01) |

(52) U.S. Cl.
CPC ............. *A47H 27/00* (2013.01); *A01G 9/028* (2013.01); *A01G 9/12* (2013.01); *A47G 33/00* (2013.01); *H02S 40/38* (2014.12)

(58) Field of Classification Search
CPC .......... A01G 9/08; A01G 9/027; A01G 9/026; A01G 9/023; A01G 9/02; A01G 2009/003; A01G 9/00; A47G 7/044; A47G 7/045; A47H 27/00; B65D 21/086; B65D 21/08; B65D 11/18; B65D 21/083; B65F 1/0046; A63H 3/52; E06B 7/28

USPC ........ 220/4.03, 4.31, 4.32, 8, 534, 543, 544, 220/549, 551

See application file for complete search history.

(56) References Cited

U.S. PATENT DOCUMENTS

| | | | |
|---|---|---|---|
| 324,291 A | 8/1885 | Bennett | |
| 876,235 A * | 1/1908 | Quackenboss | A01G 9/02 220/8 |
| 2,064,438 A * | 12/1936 | McNulty | A47H 27/00 160/227 |
| 2,223,074 A * | 11/1940 | Martin | B65D 21/086 220/8 |
| 2,620,082 A * | 12/1952 | Harmon | A47F 5/0068 220/8 |

(Continued)

FOREIGN PATENT DOCUMENTS

FR 2896142 A1 * 7/2007 ............. A47G 7/044

*Primary Examiner* — Kristen C Hayes
(74) *Attorney, Agent, or Firm* — Shore IP Group, PLLC; Sean R. Wilsusen

(57) ABSTRACT

A window planter includes a first compartment including a first sidewall and a second sidewall. The first compartment is configured to house a first group of plants. A second compartment is slidably coupled to the first compartment. The first compartment includes a first outer sidewall. The second compartment is configured to house a second group of plants separated from the first group of plants by the first sidewall of the first compartment. A third compartment is slidably coupled to the first compartment. The third compartment includes a second outer sidewall. The third compartment is configured to house a third group of plants separated from the first group of plants by the second sidewall. At least the first compartment and the second compartment are configured to be secured to a window frame.

20 Claims, 23 Drawing Sheets

(56) References Cited

U.S. PATENT DOCUMENTS

| | | | | |
|---|---|---|---|---|
| 3,691,671 | A * | 9/1972 | Kroll | A63H 3/52 |
| | | | | 220/8 |
| 4,036,369 | A * | 7/1977 | Eisenberg | A47B 45/00 |
| | | | | 248/48.2 |
| 4,909,406 | A | 3/1990 | Wu | |
| 4,982,857 | A * | 1/1991 | Sher | B65F 1/0046 |
| | | | | 220/4.03 |
| 5,133,489 | A | 7/1992 | Loew | |
| 6,209,260 | B1 | 4/2001 | Surette | |
| 7,066,563 | B2 * | 6/2006 | Berger | A47B 88/994 |
| | | | | 312/348.3 |
| 10,501,232 | B1 | 12/2019 | Price | |
| 2007/0224912 | A1 * | 9/2007 | Hughes | A63H 3/52 |
| | | | | 446/476 |
| 2009/0075560 | A1 * | 3/2009 | Smith | A63H 3/52 |
| | | | | 446/478 |

\* cited by examiner

WINDOW PLANTER INCLUDING SLIDABLE COMPARTMENTS

CROSS REFERENCE TO RELATED APPLICATION

The present application is a continuation-in-part of U.S. patent application Ser. No. 17/018,010, filed on Sep. 11, 2020, the entire contents of which are incorporated by reference herein.

FIELD

The present disclosure relates to a window planter and, more specifically, to a window planter including slidable compartments.

BACKGROUND

Window planting systems are often positioned in windows of varied shapes and sizes. Thus, window planters of many fixed sizes are often produced to accommodate windows of different sizes. As an example, individuals living in apartments such as in high rise buildings may desire to create outdoor planting spaces in windows of varying sizes by installing window planters that can be securely coupled to such window frames.

SUMMARY

Provided in accordance with aspects of the present disclosure is a window planter including a first compartment including a first sidewall and a second sidewall. The first compartment is configured to house a first group of plants. A second compartment is slidably coupled to the first compartment. The first compartment includes a first outer sidewall. The second compartment is configured to house a second group of plants separated from the first group of plants by the first sidewall of the first compartment. A third compartment is slidably coupled to the first compartment. The third compartment includes a second outer sidewall. The third compartment is configured to house a third group of plants separated from the first group of plants by the second sidewall. At least the second compartment and the third compartment are configured to be secured to a window frame.

In an aspect of the present disclosure, the second compartment includes a first overhang, and the third compartment includes a second overhang. The first and second overhangs are each configured to be secured in a screen channel of the window frame.

In an aspect of the present disclosure, a first lattice panel extends from the second compartment, and a second lattice panel extends from the third compartment.

In an aspect of the present disclosure, the first lattice panel includes a first overhang configured to be secured to the window frame, and the second lattice panel includes a second overhang configured to be secured to the window frame.

In an aspect of the present disclosure, the first overhang and the second overhang are configured to be secured in a screen channel of the window frame.

In an aspect of the present disclosure, the first lattice panel includes a first attachment bracket at an upper end thereof. The second lattice panel includes a second attachment bracket at an upper end thereof. The first and second attachment brackets are configured to secure the upper ends of the first and second lattice panels to the window frame, or to a window housed in the window frame. The first or second attachment brackets include a Velcro® connection, a hook and eye connection, or an adhesive connection.

In an aspect of the present disclosure, the first compartment includes a false bottom including a plurality of spacers configured to elevate the false bottom above a bottom surface of the first compartment. The false bottom forms a space above the bottom surface of the first compartment. The space is configured to hold water for indirect watering of the first group of plants housed in the first compartment.

In an aspect of the present disclosure, the space includes an aperture formed in a rear wall of the first compartment. The aperture is configured to drain water from the space above the bottom surface of the first compartment. The aperture is positioned to limit an upper level of water stored in the space.

In an aspect of the present disclosure, a first sidewall aperture is formed in the first sidewall of the first compartment, and a second sidewall aperture formed in the second sidewall of the first compartment. The first and second sidewall apertures are configured to pass water from the first compartment to the second and third compartments, respectively.

In an aspect of the present disclosure, the first and second sidewall apertures are in fluid communication with the space above the bottom surface of the first compartment.

In an aspect of the present disclosure, a lid is configured to create a watertight seal at an upper level of the first compartment. A battery may be positioned in the first compartment when the lid covers the first compartment. The battery may be charged by a solar panel.

In an aspect of the present disclosure, at least one hollow compartment is formed in a rear wall of the first compartment, the second compartment or the third compartment. The hollow compartment is configured to store water for watering plants.

In an aspect of the present disclosure, the hollow compartment is in fluid communication with the first compartment, the second compartment, or the third compartment.

In an aspect of the present disclosure, at least one water wicking strand extends between the at least one hollow compartment and the first compartment, the second compartment, or the third compartment. The at least one water wicking strand is configured to draw water out of the at least one hollow compartment at a predetermined rate.

In an aspect of the present disclosure, the at least one water wicking strand includes or is formed of cotton, nylon or acrylic.

In an aspect of the present disclosure, each of the first compartment, the second compartment, and the third compartment includes a hollow compartment formed in the rear surface thereof. Each hollow compartment includes an upper aperture at an upper level thereof configured to fill each hollow compartment with water.

In an aspect of the present disclosure, the window planter includes a first elevated compartment supported above the second compartment. The first elevated compartment is configured to house a fourth group of plants. A second elevated compartment is supported above the third compartment. The second elevated compartment is configured to house a fifth group of plants. A first forward compartment is supported by the second compartment. The first forward compartment is configured to house a sixth group of plants. A second forward compartment is supported by the third compartment. The second forward compartment is configured to house a seventh group of plants.

In an aspect of the present disclosure, a first side compartment is supported by the first outer sidewall of the second compartment. A second side compartment is supported by the second outer sidewall of the third compartment. The first side compartment is configured to house an eight group of the plants. The second side compartment configured to house a ninth group of plants.

In an aspect of the present disclosure, the first lattice panel is a modular panel including a multiple first lattice members. The second lattice panel is a modular panel including multiple second lattice members.

In an aspect of the present disclosure, the first lattice members each include first apertures and first pins disposed in the first apertures to secure the first lattice members to each other. The second lattice members each include second apertures and second pins disposed in the second apertures to secure the second lattice members to each other.

In an aspect of the present disclosure, at least one of the second compartment, the third compartment, the first forward compartment or the second forward compartment includes a water reservoir.

In an aspect of the present disclosure, a first accessory attachment bracket is supported by the second compartment. A second accessory attachment bracket may also be supported by the third compartment.

In an aspect of the present disclosure, at least one floating compartment is removably coupled with the first lattice panel or the second lattice panel.

In an aspect of the present disclosure, at least one decorative accessory is removably coupled with the first lattice panel or the second lattice panel.

BRIEF DESCRIPTION OF THE DRAWINGS

Various aspects and features of the present disclosure are described hereinbelow with reference to the drawings wherein.

DETAILED DESCRIPTION

Figure 1:
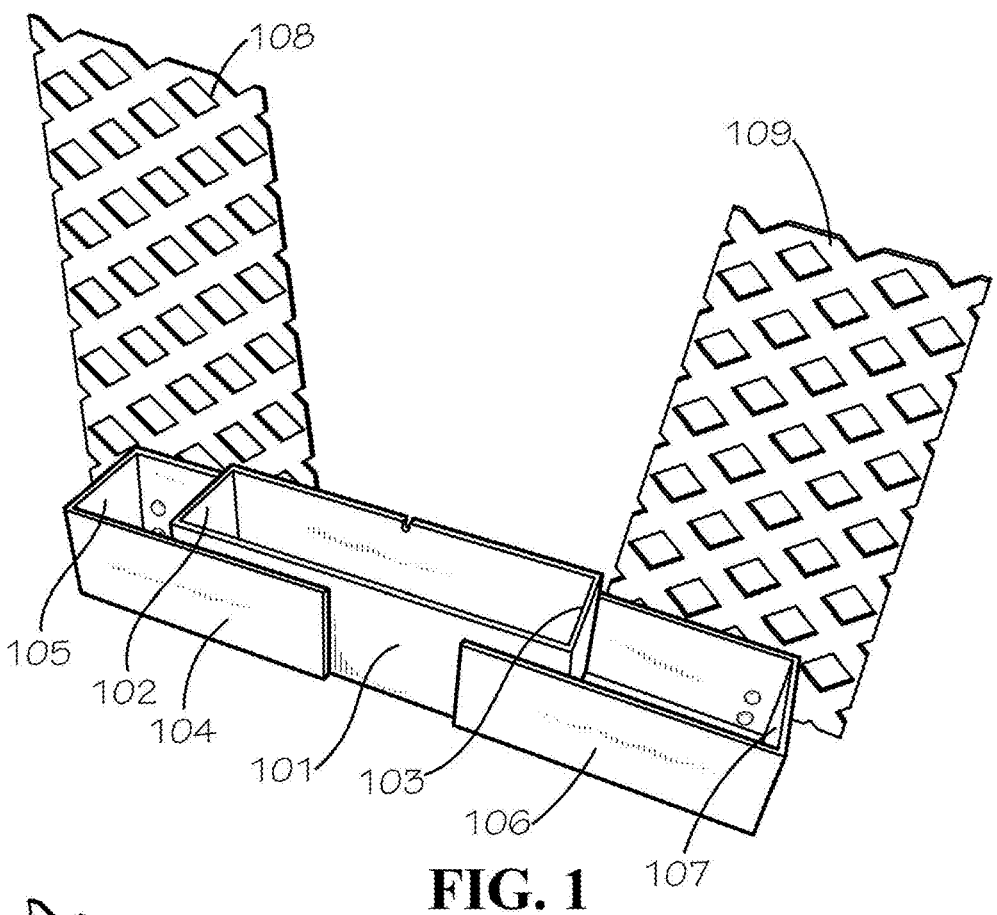
FIG. 1 is a front perspective view of a window planter according to aspects of the present disclosure.
Figure 2:
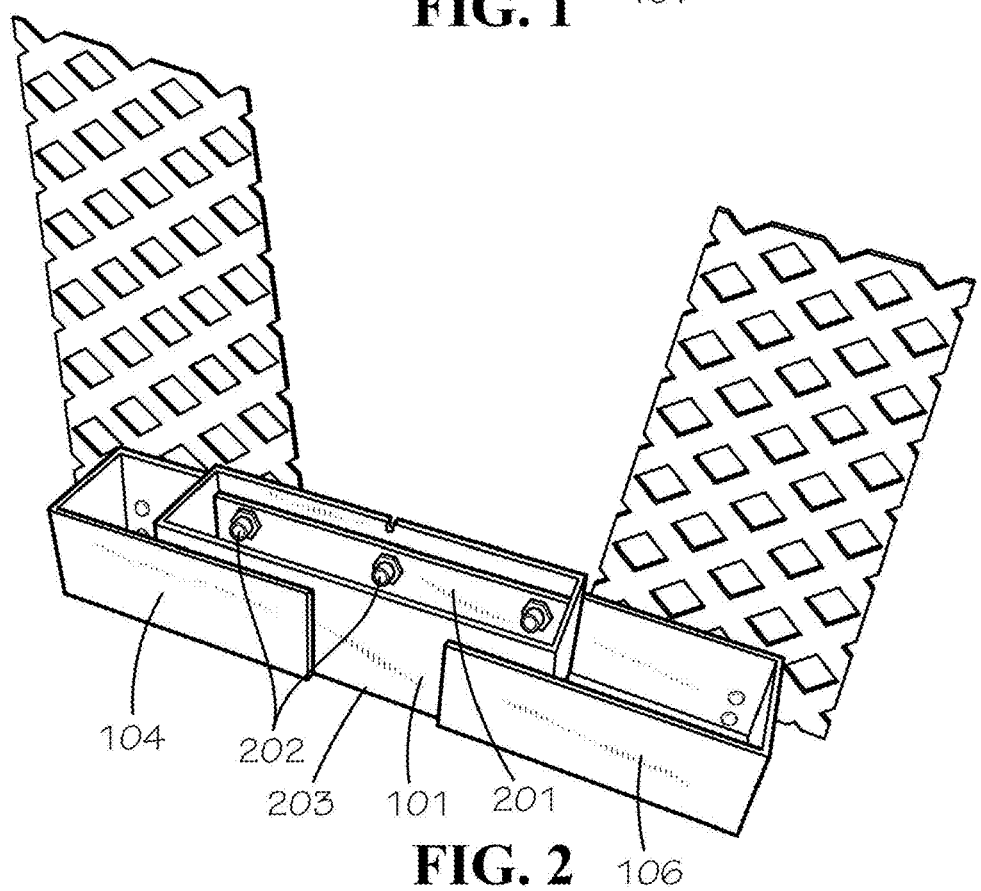
FIG. 2 is a front perspective view of the window planter of FIG. 1 with the false bottom tilted up in the first compartment.
Figure 3:
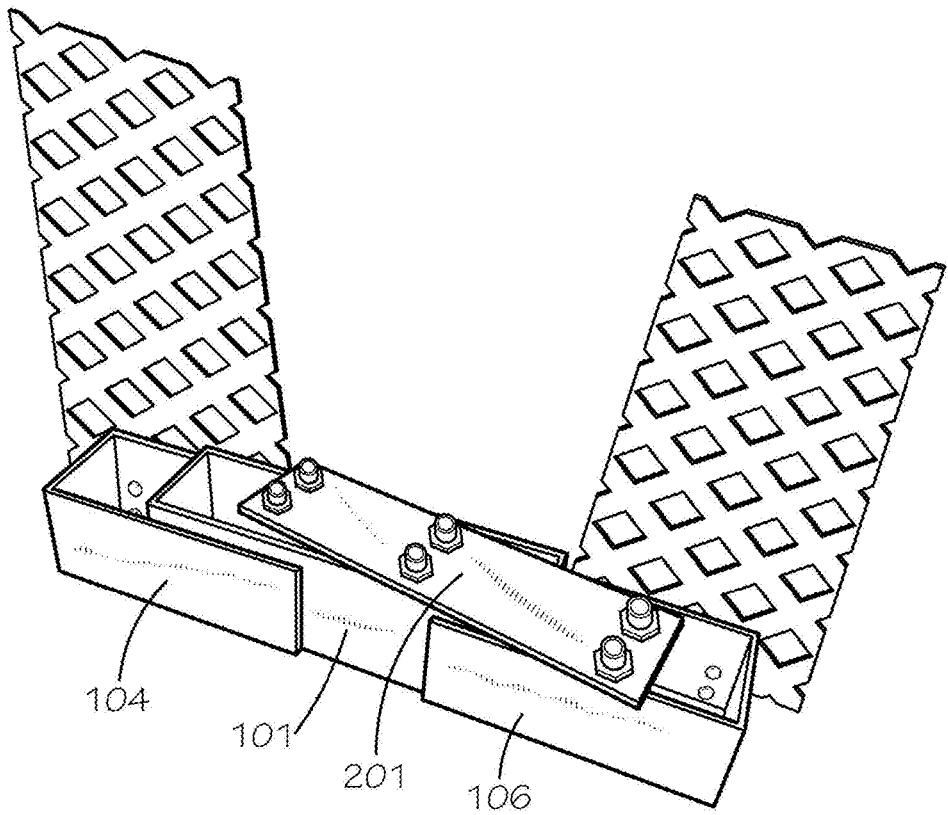
FIG. 3 is a front perspective view of the window planter of FIG. 1 with the false bottom separated from the first compartment.
Figure 4:
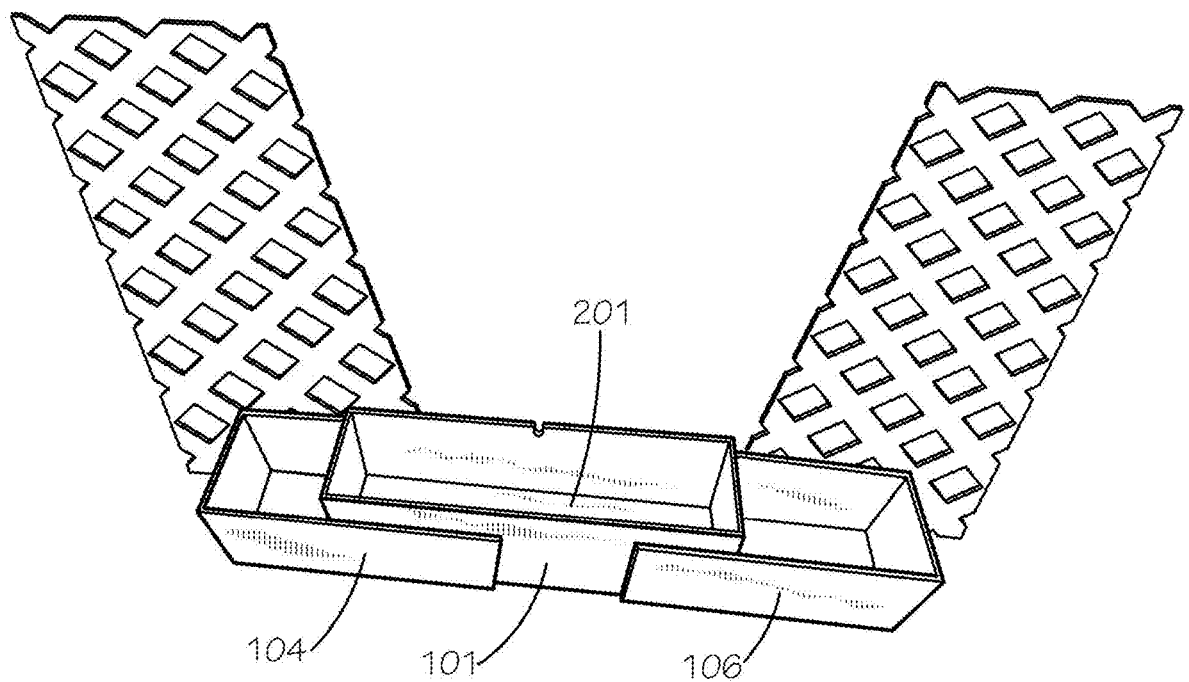
FIG. 4 is a front perspective view of the window planter of FIG. 1 with the false bottom removed.
Figure 5:
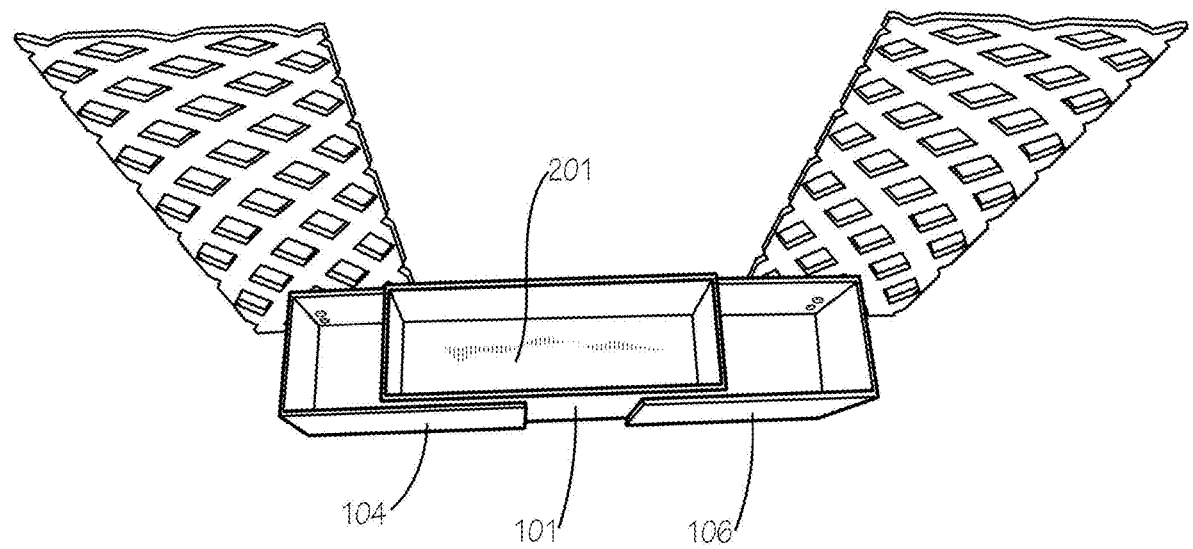
FIG. 5 is a top down view of the window planter of FIG. 1 showing a sliding track of the third compartment.
Figure 6:
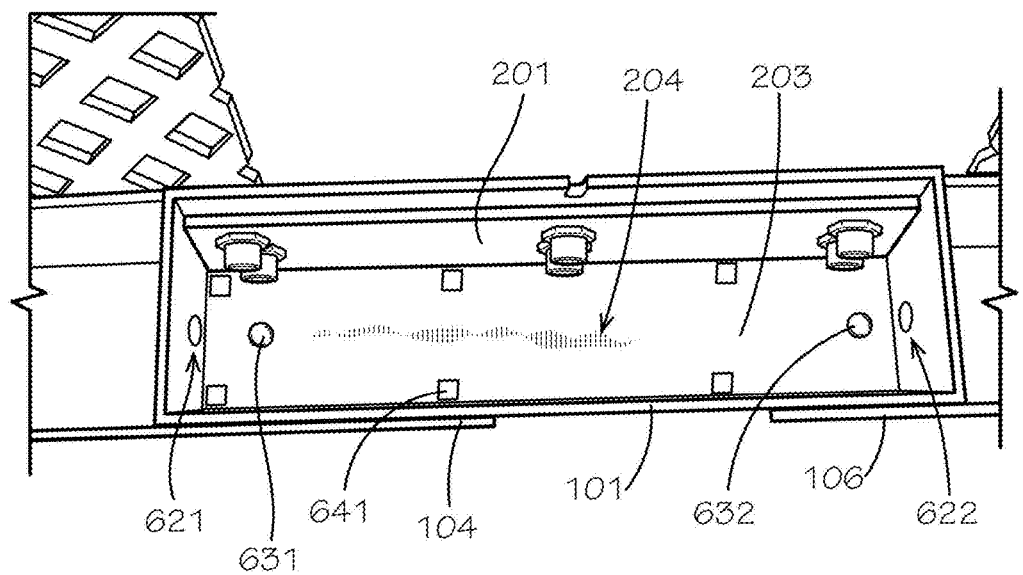
FIG. 6 is an inside view of the first compartment of FIG. 1 with the false bottom tilted up, and first and second bolts extending through the first compartment into the sliding tracks of the second and third compartments.
Figure 7:
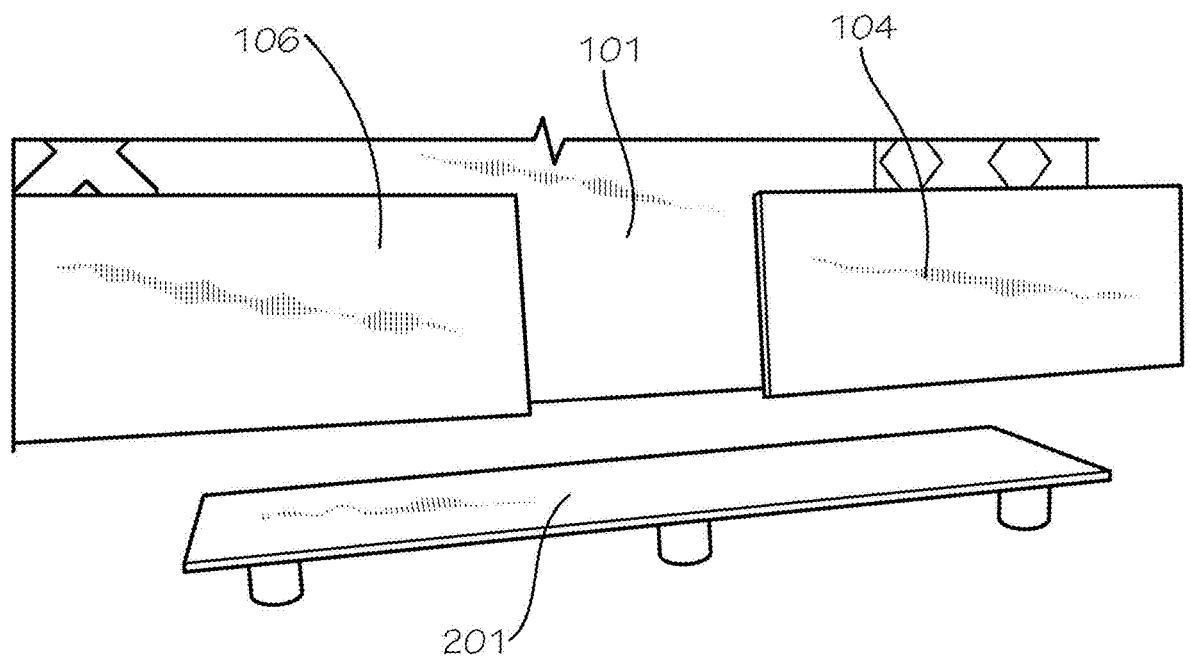
FIG. 7 is a front view of the window planter of FIG. 1 with the false bottom removed.
Figure 8:
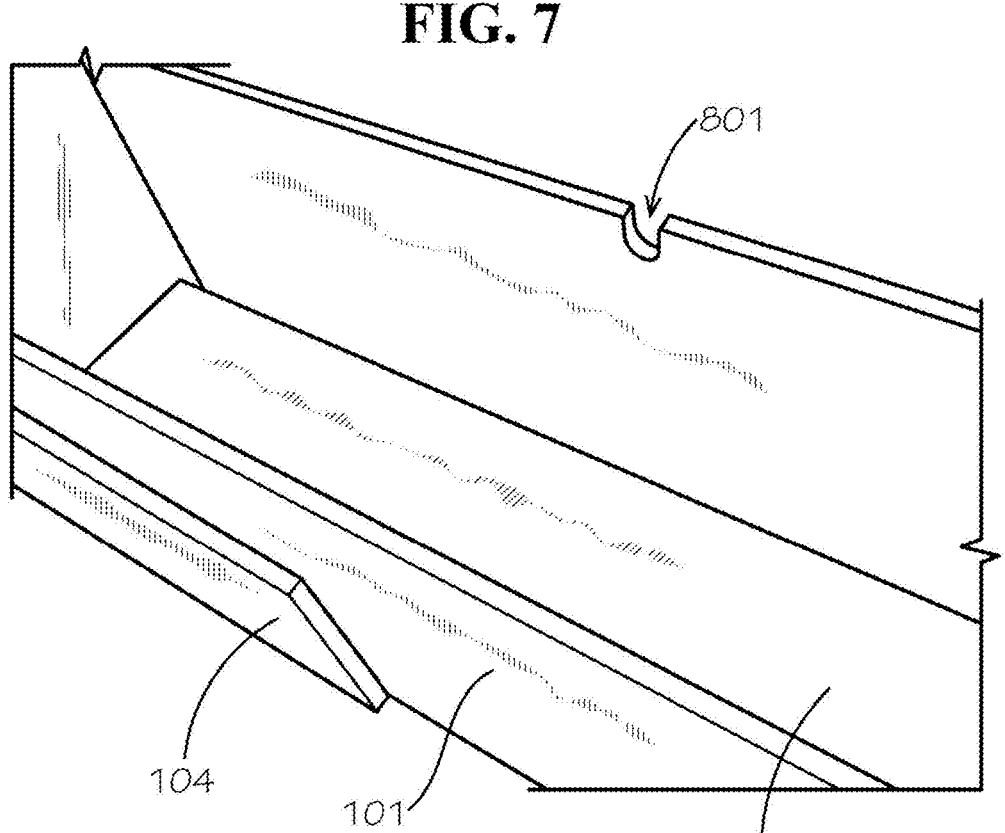
FIG. 8 is an expanded front view of the first compartment of FIG. 1 with the false bottom positioned in the first compartment.
Figure 9:
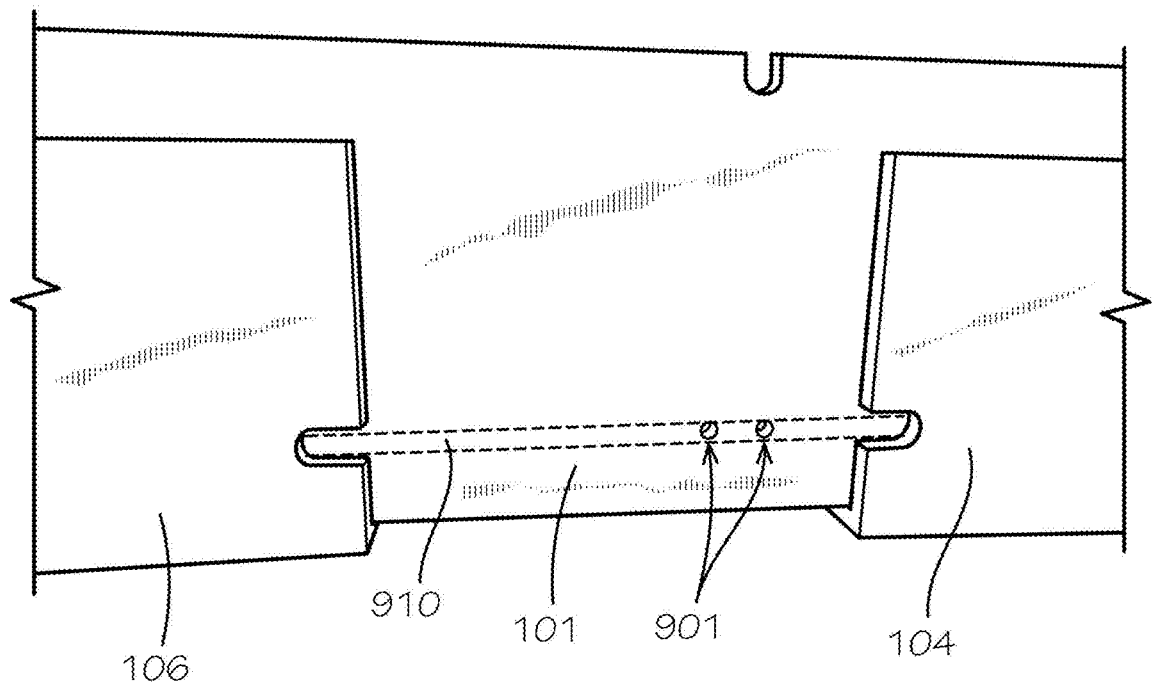
FIG. 9 is a rear view of the window planter of FIG. 1.
Figure 10:
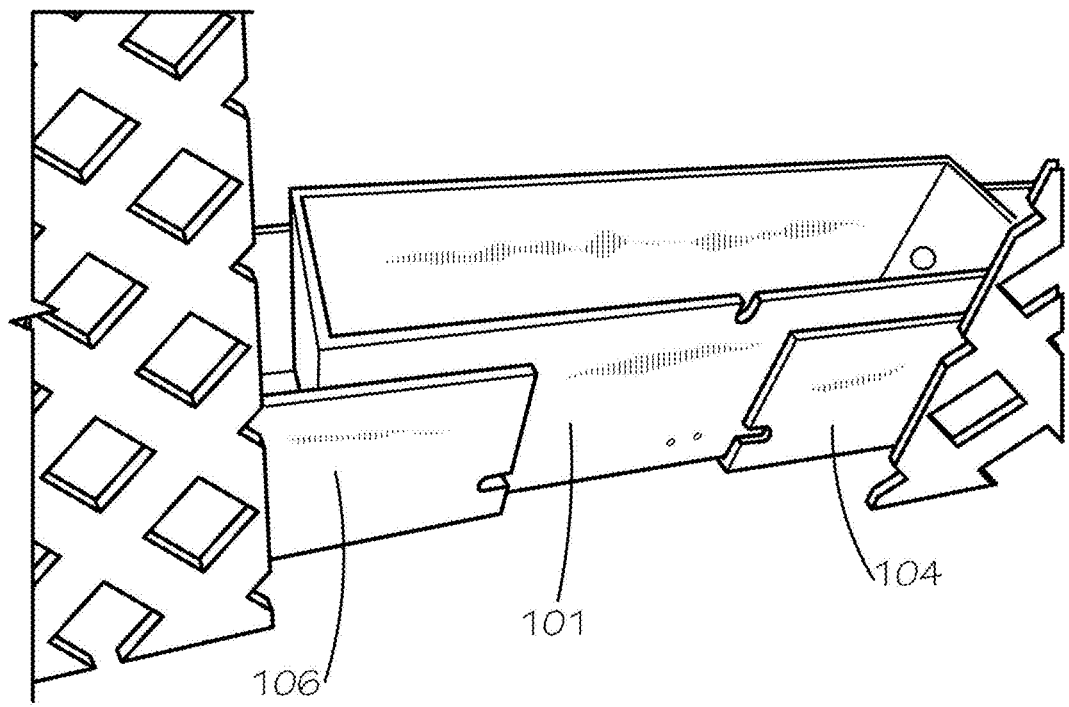
FIG. 10 is a rear perspective view of the window planter of FIG. 1.

The terms "about," substantially," and the like, as utilized herein, are meant to account for manufacturing, material, environmental, use, and/or measurement tolerances and variations, and in any event may encompass differences of up to 10%. Further, to the extent consistent, any of the aspects described herein may be used in conjunction with any or all of the other aspects described herein.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Referring to FIGS. 1 to 19, a window planter includes a first compartment 101 including a first sidewall 102 and a second sidewall 103. The first compartment 101 is configured to house a first group of plants. The groups of plants described herein may be a single plant or multiple plants. The plants can include ornamental plants such as annual or perennial plants. Alternatively, herbs can be planted. Each plant or group of plants can be separated from each other by being planted in the different compartments described herein.

A second compartment 104 is slidably coupled to the first compartment 101. The second compartment 104 includes a first outer sidewall 105. The second compartment 104 is configured to house a second group of plants separated from the first group of plants by the first sidewall 102 of the first compartment 101. A third compartment 106 is slidably coupled to the first compartment 101. The third compartment 106 includes a second outer sidewall 107. The third compartment 106 is configured to house a third group of plants separated from the first group of plants by the second sidewall 103. At least the second compartment 104 and the third compartment 106 are configured to be secured to a window frame.

In use, the second and third compartments 104, 106 are slid outwardly from the first compartment 101 to approximately fit inside a window frame into which the window planter is being installed. The second and third compartments 104, 106 are secured in place with respect to the first compartment and prevented from sliding inwardly (e.g., via the nut and bolt system described in more detail below). At least the second and third compartments 104, 106 are then secured to the window frame, as described herein. Thus, the window planter is prevented from moving laterally, or in a front to back direction, to secure the window planter to a window frame allow planting therein, as desired.

Figure 16:
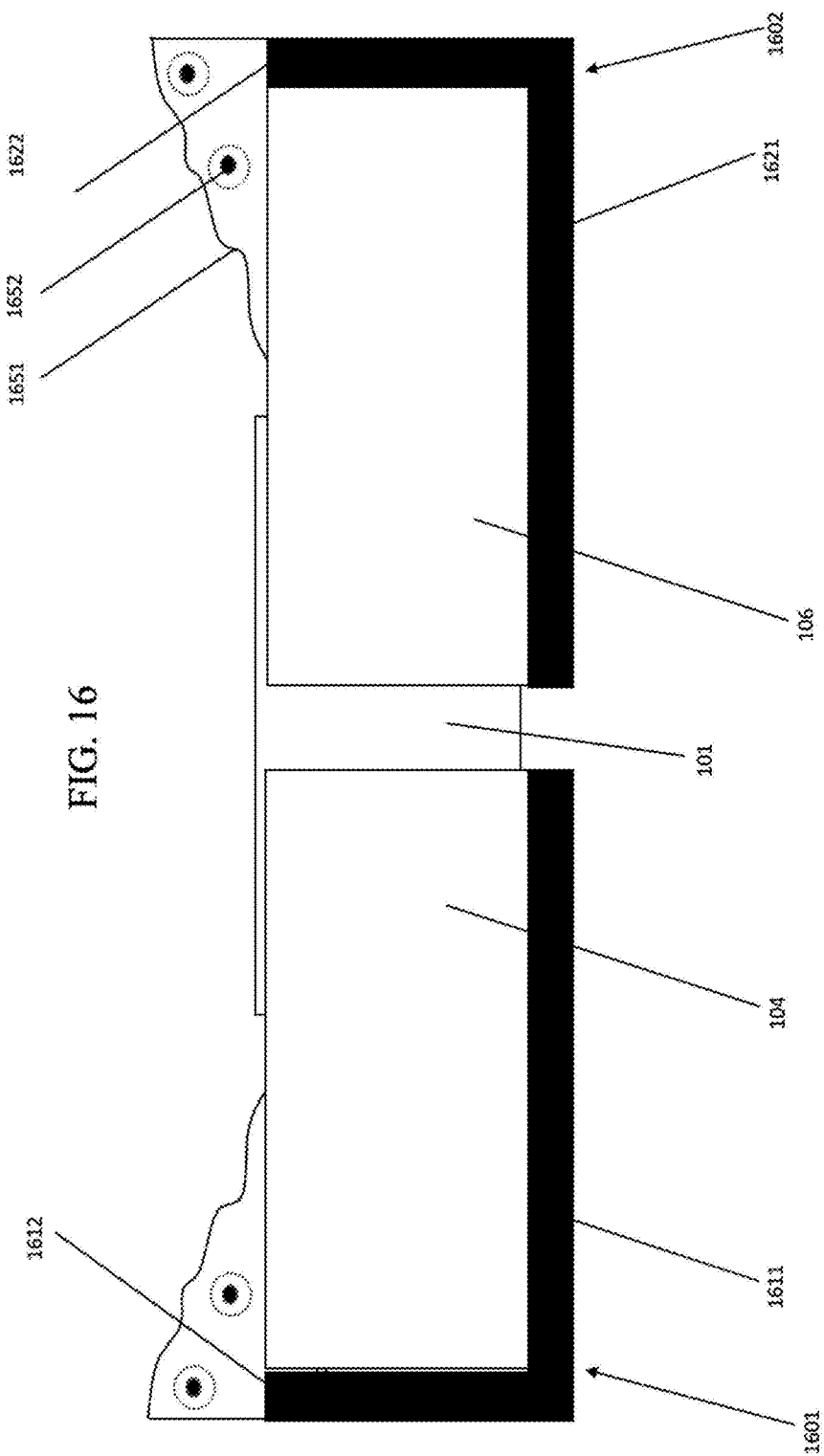
FIG. 16 is a rear view of the window planter of FIG. 1, with the lattice panels omitted, and including overhangs extending from the second and third compartments.
Figure 17:
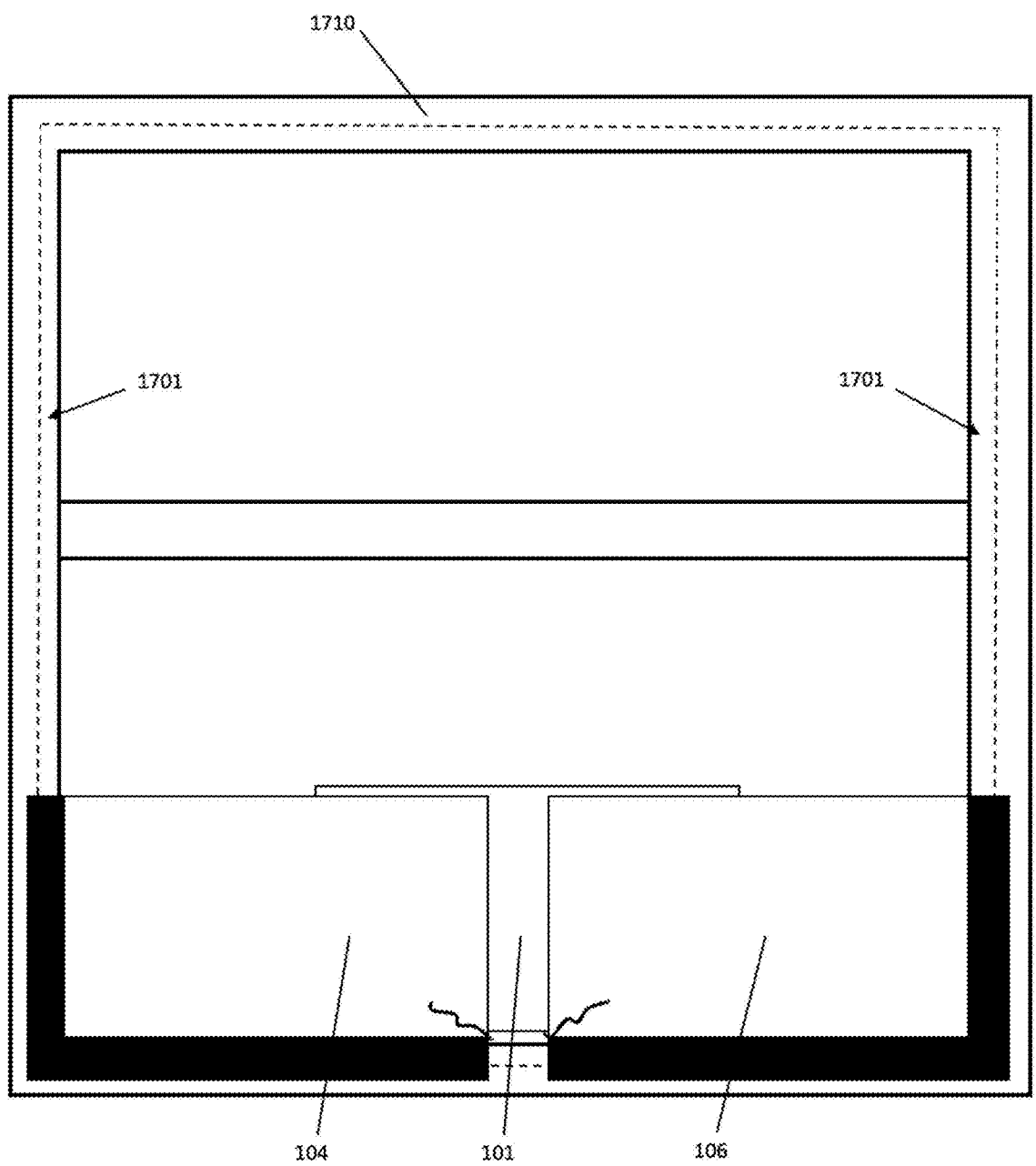
FIG. 17 is a cross-sectional view of the window planter of FIG. 16 with the overhangs positioned in a screen channel of a window.
Figure 18:
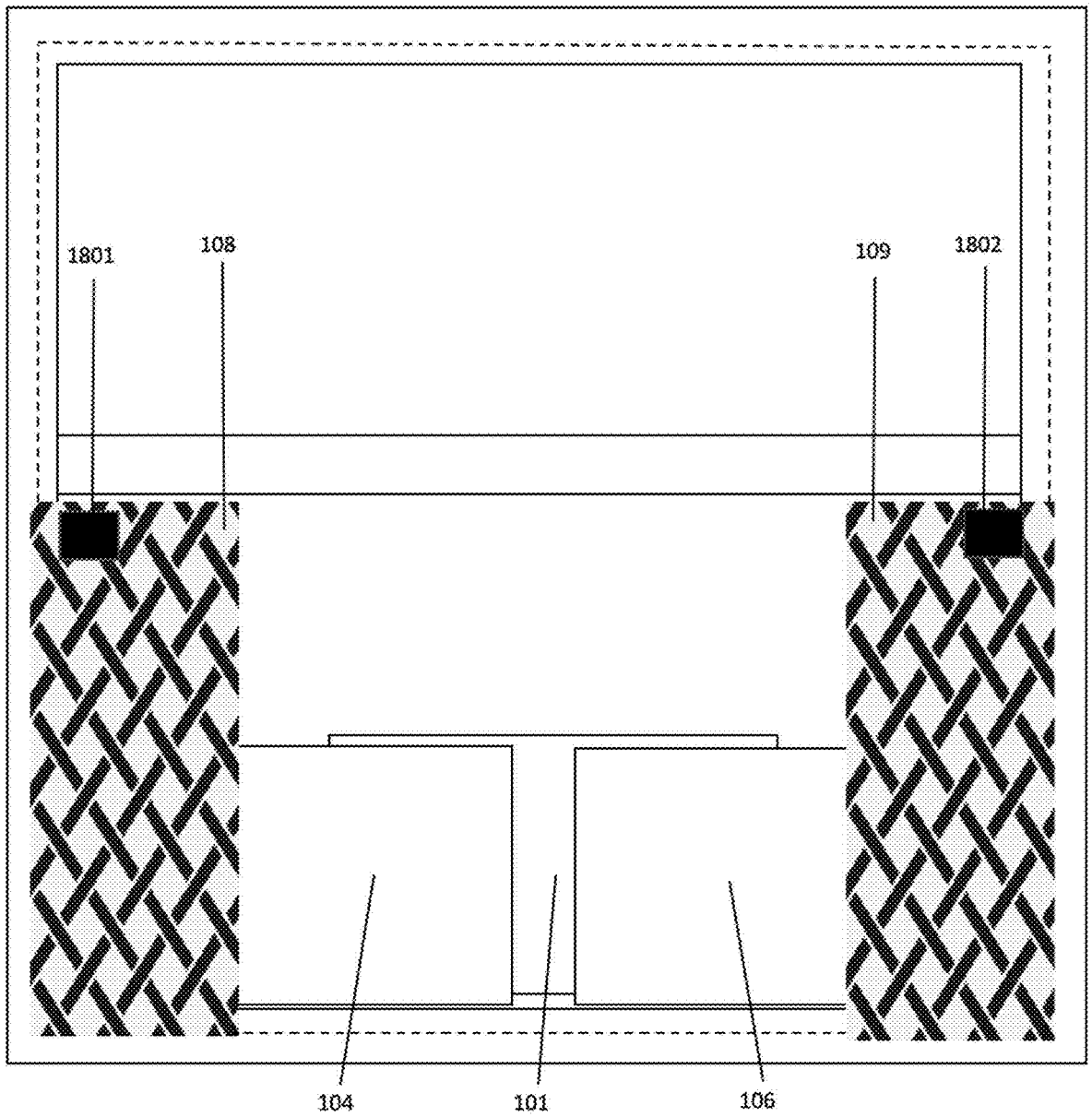
FIG. 18 is a cross-sectional view of the window planter of FIG. 1 with the lattice panels overhanding the front and rear panels and positioned in a screen channel of a window.
Figure 19:
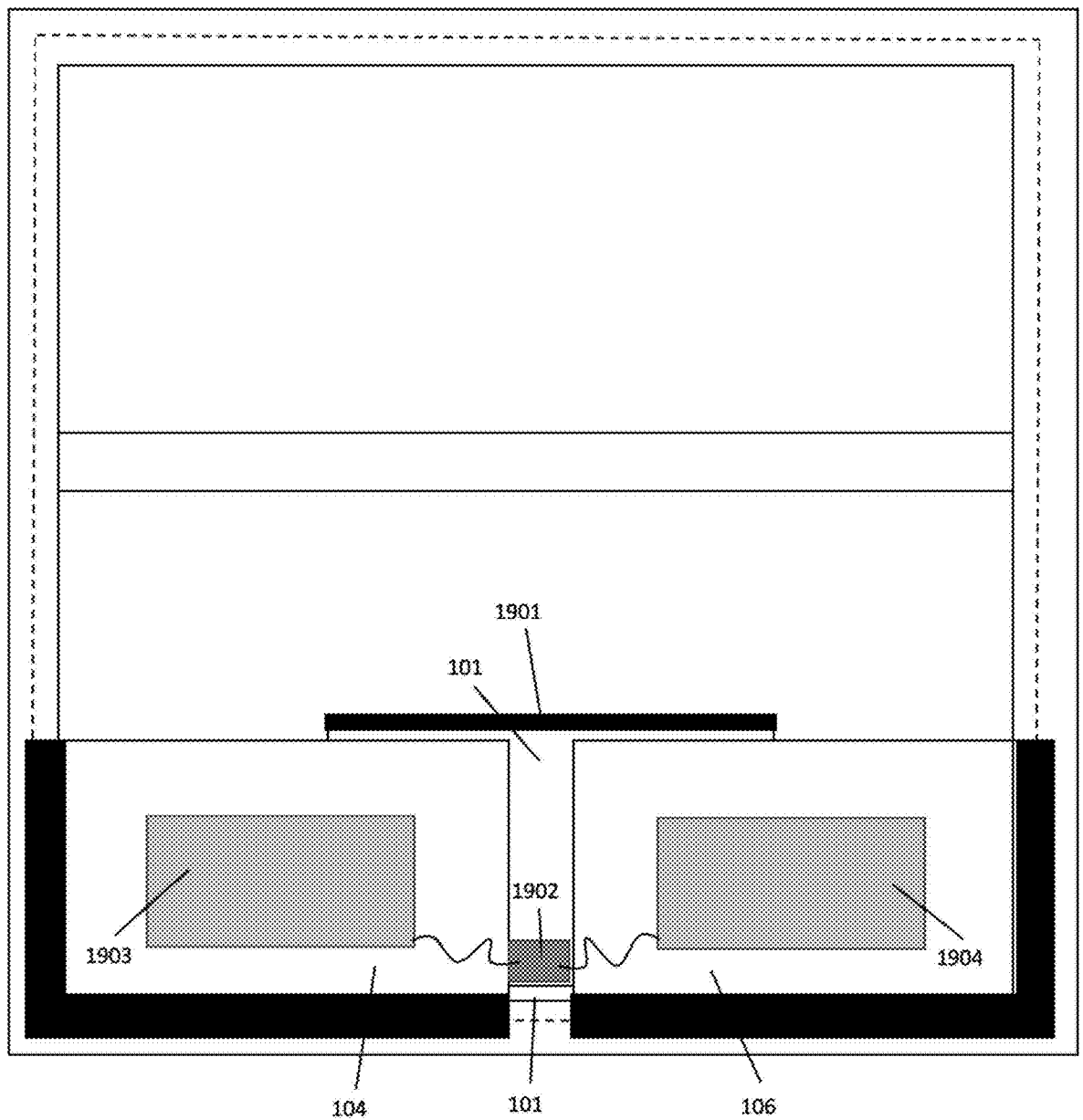
FIG. 19 illustrates the window planter of FIG. 1 with a lid, battery, and solar panels according to aspects of the present disclosure.

In an aspect of the present disclosure, the second compartment 104 includes a first overhang 1601, and the third compartment 106 includes a second overhang 1602 (see, e.g., FIG. 16). The first and second overhangs 1601 and 1602 are each configured to be secured in a screen channel 1701 of the window frame 1710 (see, e.g., FIG. 17). The first overhang 1601 may include a horizontal overhang 1611 and/or a vertical overhang 1612, and the second overhang 1602 may similarly include a horizontal overhang 1621 and/or a vertical overhang 1622.

In an aspect of the present disclosure, a first lattice panel 108 extends from the second compartment 104, and a second lattice panel 109 extends from the third compartment 106.

Figure 11:
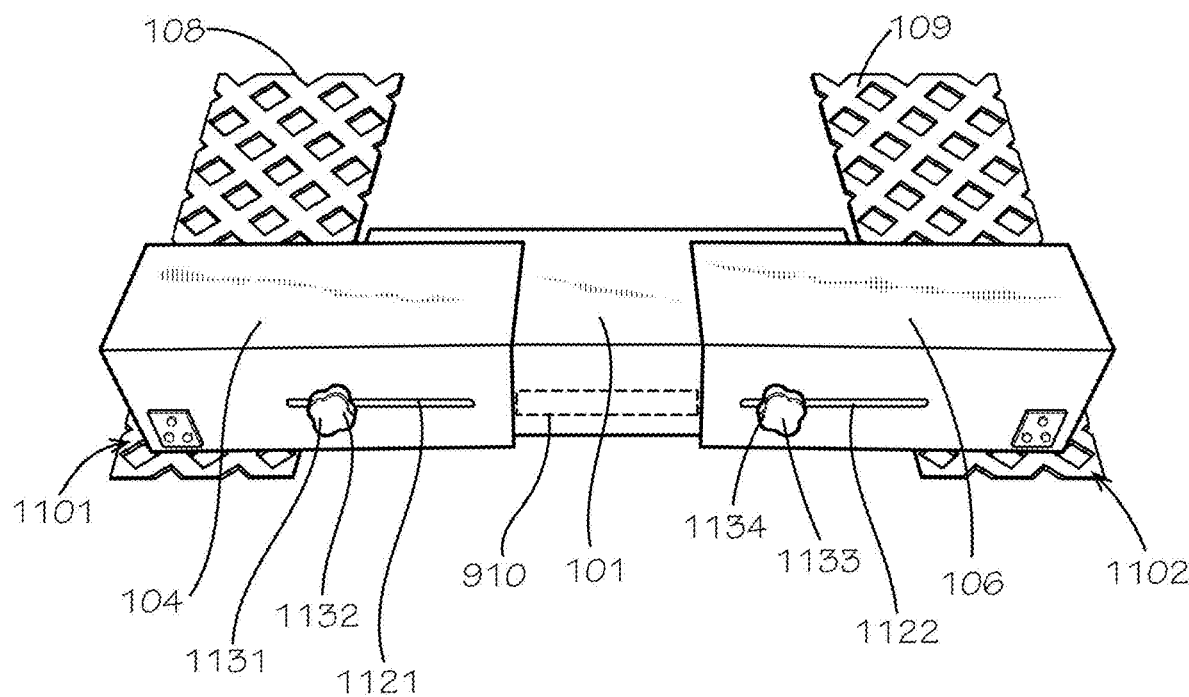
FIG. 11 is a bottom view of the window planter of FIG. 1.
Figure 12:
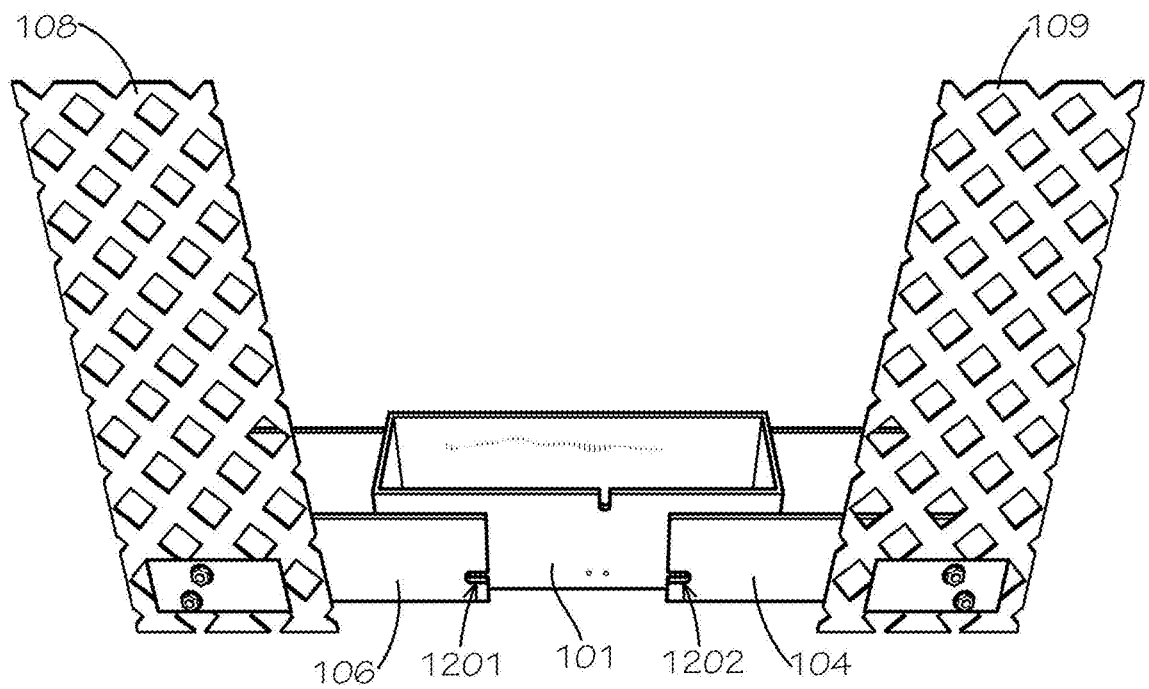
FIG. 12 is a rear view of the window planter of FIG. 1.
Figure 13:
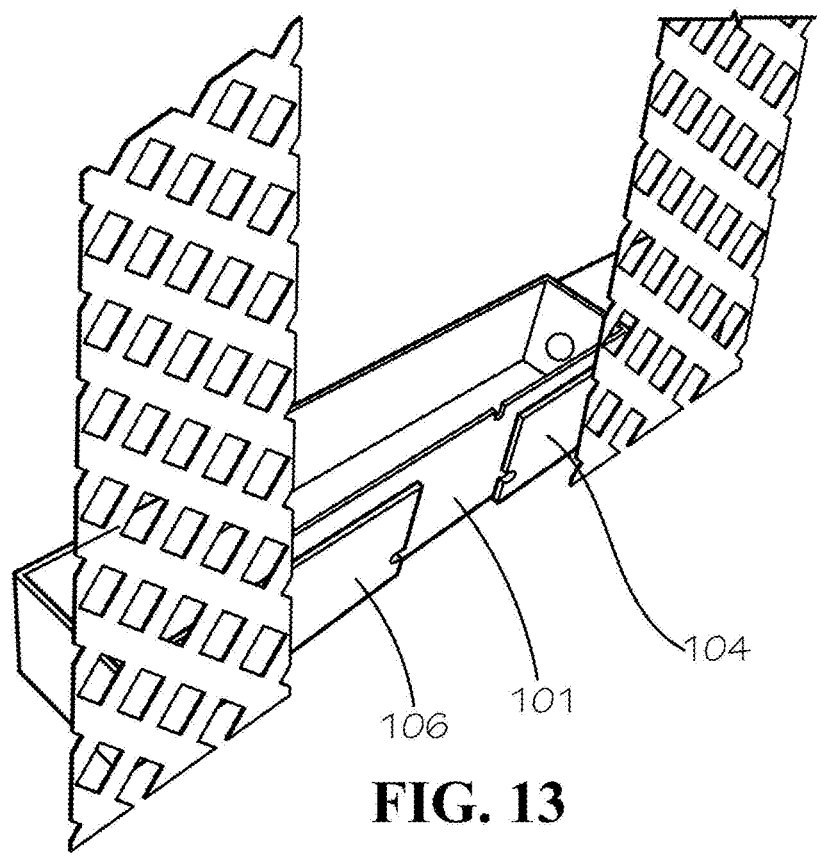
FIG. 13 is a rear, perspective view of the window planter of FIG. 1.
Figure 14:
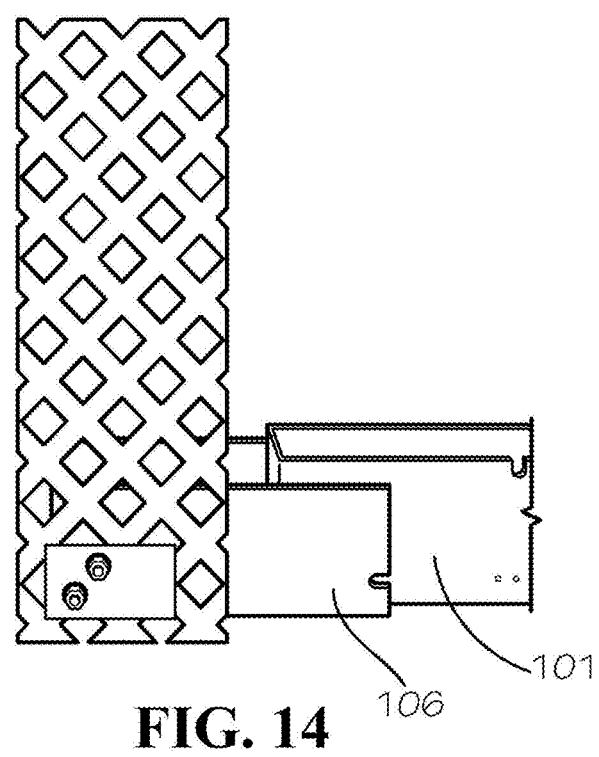
FIG. 14 is a partial rear view of the window planter of FIG. 1.
Figure 15:
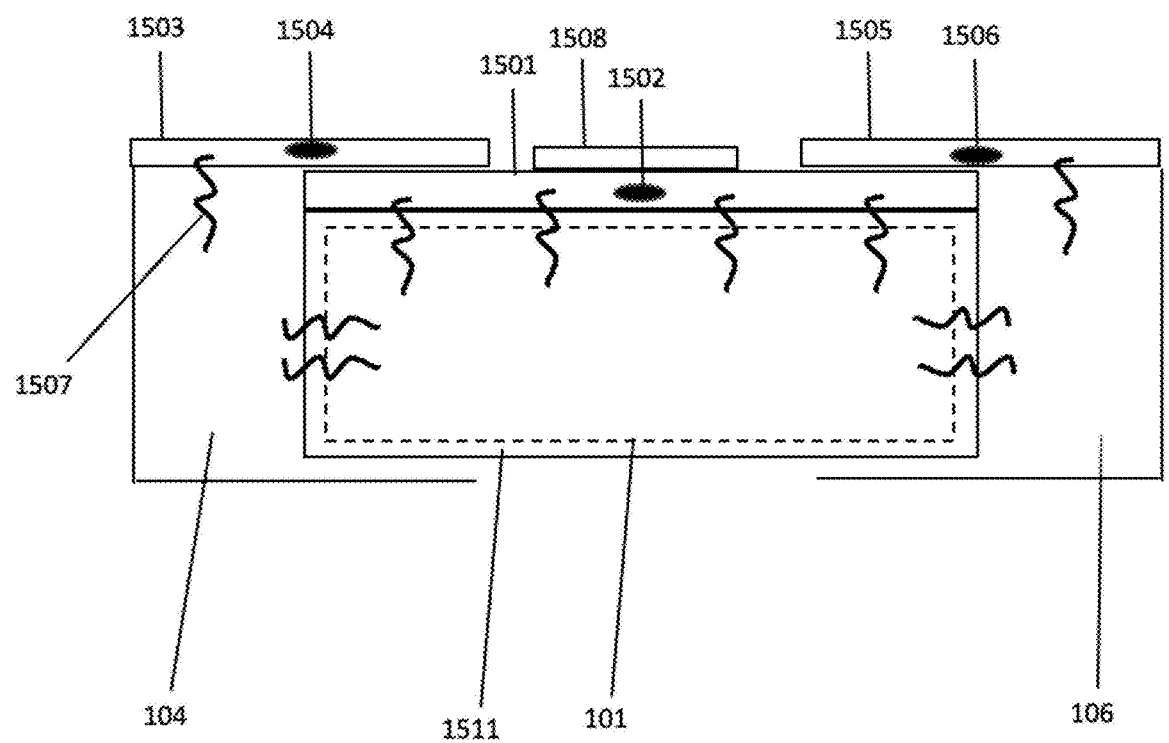
FIG. 15 is a top down view of the window planter of FIG. 1, including hollow rear components and water wicking strands.

In an aspect of the present disclosure, the first lattice panel 108 includes a first overhang 1101 configured to be secured to the window frame 1710, and the second lattice panel includes a second overhang 1102 configured to be secured to the window frame 1710 (see, e.g., FIG. 11). Similar to the overhang described with reference to FIG. 16, the first and second overhangs 1101 and 1102 may each include horizontal and vertical overhangs configured to be secured in the screen channel 1701 of the window frame 1710. The overhangs described herein positioned in screen channel 1701 of the window frame 1710 prevent movement of the window planter, while still allowing opening and closing of the window positioned behind the window planter.

In an aspect of the present disclosure, the first lattice panel 108 includes a first attachment bracket 1801 at an upper end thereof. The second lattice panel 109 includes a second attachment bracket 1802 at an upper end thereof. The first and second attachment brackets 1801 and 1802 are configured to secure the upper ends of the first and second lattice panels 108 and 109 to the window frame 1710, or to a window housed in the window frame 1710. The first or second attachment brackets 1801 and 1802 may include a Velcro® connection, a hook and eye connection, or an adhesive connection. The attachment brackets 1801 and 1802 can be employed as an additional attachment mechanism for securing the window planter to a desired window frame. In particular, the attachment brackets 1801 and 1802 prevent forward movement of the lattice panels 108, 109.

In an aspect of the present disclosure, the first compartment includes a false bottom 201 including a plurality of spacers 202 configured to elevate the false bottom 201 above a bottom surface 203 of the first compartment 101. The false bottom 201 forms a space 204 above the bottom surface 203 of the first compartment 101. The space 204 is configured to hold water for indirect watering of the first group of plants housed in the first compartment 101.

In an aspect of the present disclosure, the space includes an aperture 901 formed in a rear wall of the first compartment 101. The aperture 901 is configured to drain water from the space 204 above the bottom surface 203 of the first compartment 101. The aperture 901 is positioned to limit an upper level of water stored in the space 204.

In an aspect of the present disclosure, a first sidewall aperture 621 is formed in the first sidewall 102 of the first compartment 101, and a second sidewall aperture 622 formed in the second sidewall 103 of the first compartment 101. The first and second sidewall apertures 621 and 622 are configured to pass water from the first compartment 101 to the second and third compartments 104 and 106, respectively.

In an aspect of the present disclosure, the first and second sidewall apertures 621 and 622 are in fluid communication with the space 204 above the bottom surface 203 of the first compartment 101.

In an aspect of the present disclosure, a lid 1901 is configured to create a watertight seal at an upper level of the first compartment 101. Creating a watertight seal can be employed to create a clear dry space within the first compartment 101, which may be employed when the window planter is employed for uses other than holding plants, such as displaying holiday lights or decorations, as described herein. A battery 1902 may be positioned in the first compartment 101 when the lid 1901 covers the first compartment 101. The battery 1902 may be a rechargeable lithium ion battery, as an example. While a separate lid 1901 may be employed, the false bottom 201 may also be employed as a lid for the first compartment.

The battery 1902 may be charged by a solar panel 1903 and/or 1904. As an example, the second compartment 104 and/or the third compartment 106 may each support solar panel 1903 or solar panel 1904.

In an aspect of the present disclosure, at least one hollow compartment 1501, 1502, or 1503 is formed in a rear wall of the first compartment 101, the second compartment 104 or the third compartment 106. The hollow compartment 1501, 1502, or 1503 is configured to store water for watering plants.

In an aspect of the present disclosure, the hollow compartment 1501, 1502, or 1503 is in fluid communication with the first compartment 101, the second compartment 104 or the third compartment 106.

In an aspect of the present disclosure, at least one water wicking strand 1507 extends between the at least one hollow compartment 1501, 1502, or 1503 and the first compartment 101, the second compartment 104 or the third compartment 106. The at least one water wicking strand 1507 is configured to draw water out of the at least one hollow compartment 1501, 1502, or 1503 at a predetermined rate.

In an aspect of the present disclosure, the at least one water wicking strand 1507 includes or is formed of cotton, nylon or acrylic.

In an aspect of the present disclosure, each of the first compartment 101, the second compartment 104, and the third compartment includes a hollow compartment formed in the rear surface thereof. Each hollow compartment includes an upper aperture 1502, 1504, or 1506 at an upper level thereof configured to fill each hollow compartment with water.

Sliding tracks 1121 and 1122 (see, e.g., FIG. 11) respectively formed in the second and third compartments 104 and 106 allow the second and third compartments 104 and 106 to slide with respect to the first compartment 101 while remaining coupled to the first compartment 101 by a bolt 631 or 632 (see, e.g., FIG. 6) extending from inside the first compartment 101 through the sliding tracks 1121 or 1122 of the second and third compartments 104 and 106. A nut 1131 or 1133 can be tightened about each of the bolts 631 or 632 to secure the second and third compartments 104 or 106 in a desired position with respect to the first compartment 101t. Each bolt 631 or 632 may include a hand knob 1132 or 1134 to allow hand tightening of the bolt 631 or 632.

A notch 801 (see, e.g., FIG. 8) may be formed in a rear surface of the first compartment 101 (e.g., to allow access to the battery 1902) to connect wires for Christmas lights, etc.

As an example, the window planter described herein may be employed for displaying ornamental lighting or decorations such as holiday lights or decorations (e.g., along lattice panels 108, 109).

Notches 1201, 1202 (see, e.g., FIG. 12) may also be formed in the rear surfaces of the second and third compartments 104, 106 to allow wiring to extend into the second or third compartments 104, 106.

In an aspect of the present disclosure, the false bottom 201 may be formed of a material that allows water to flow therethrough in only a single direction. For example, water may flow into space 204 through an upper surface of the false bottom 201. However, if the false bottom 201 is inverted (e.g., to be used as a top of the first compartment 101), then water would not flow through a bottom surface of the false bottom 201 which would face in an upward direction when the false bottom 201 is used as a top for the first compartment 101.

In an aspect of the disclosure, the spacers 202 may be omitted and the false bottom 201 may rest on a plurality of protrusions 641 extending from an inner surface of the first compartment 101. Protrusions 641 may be formed intermittently around the bottom reason of the first compartment 101 (e.g., in the corners thereof), or a continuous protrusion may be formed around substantially an entire perimeter of the first compartment 101.

In an aspect of the disclosure, the false bottom 201 may be coupled to a "C" shaped channel 1511 formed at an upper level of the first compartment 101. The "C" shaped channel 1511 is configured to create a watertight seal at the top level of the first compartment 101 between the false bottom 201 which is, in this instance, used as a top for the first compartment 101 and the inner side of the first compartment 101. The "C" shaped channel 1511 may protrude slightly, while still allowing the false bottom 201 to be maneuvered into the lower region of the first compartment 101.

In an aspect of the disclosure, a plant food dispenser 1508, such as a liquid plant food dispenser may be formed at a back surface of at least one of the hollow compartments (e.g., 1502), and may be in fluid communication with at least one of the hollow compartments to provide nutrients to the plants disposed in any of compartments 101, 104, 106.

In an aspect of the disclosure, a back support 1651 may extend from an upper surface of compartments 104, 106 for removably coupling a decorative lattice panel (see, e.g., 108, 109) to the compartments 104, 106, respectively. Each back support 1651 may include at least one attachment orifice 1652 (e.g., a screw hole). Each attachment orifice 1652 may include a decorative border therearound, such as a floral pattern decorative border.

In an aspect of the disclosure, a lateral-movement blocking bar (see, e.g., 910) may prevent inward lateral movement of compartments 104, 106, thus preventing the window planter from becoming dislodged from a window frame. The position of the lateral-movement blocking bar 910 may vary. For example, the lateral-movement blocking bar 910 may be positioned at a back surface of the first compartment 101 in slots 911, 912 (see, e.g., FIG. 9), or at a bottom surface of first compartment 101 (see, e.g., FIG. 11). The lateral-movement blocking bar 910 may be a bar that is shaped and dimensioned to fit into the screen channel 1701 between overhangs 1611 and 1621. The lateral-movement blocking bar 910 may be manufactured as a customizable bar that can be cut to a size of a particular window frame to fit a space between overhangs 1611 and 1621 in a particular window.

In an aspect of the present disclosure, the overhangs, 1611, 1612, 1622, 1622 may each be extendable to project into screen channels of varying sizes or depths, and for window frames of varying sizes. For example, an additional extension piece may be added to any of overhangs 1611, 1612, 1622, 1622 to project into screen channels of varying sizes or depths, and for window frames of varying sizes.

Unless otherwise indicated below, window planters 2000 and 2100 are substantially the same as the window planter described above with reference to FIGS. 1 to 19, and thus duplicative descriptions may be omitted below.

Figure 20:
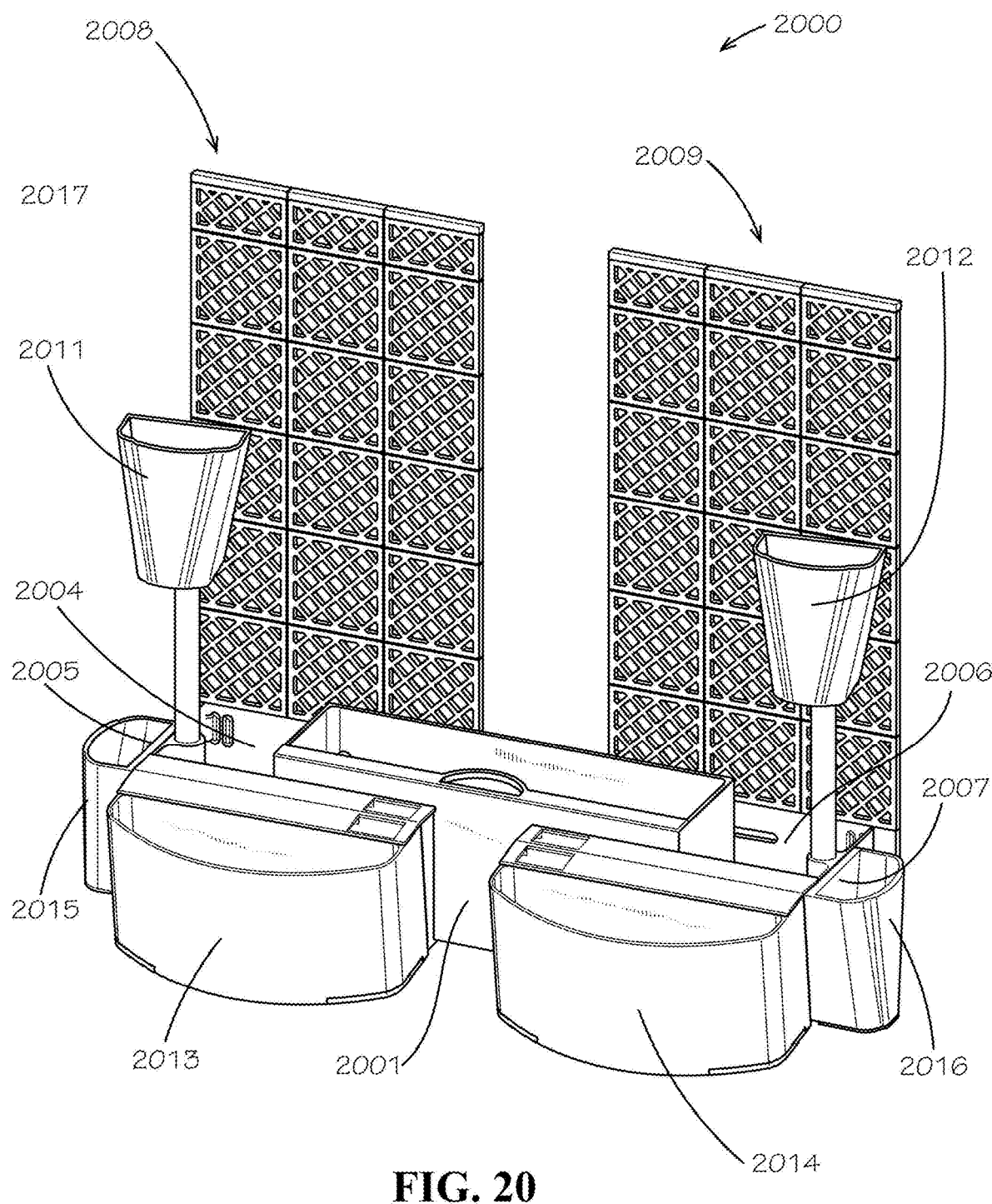
FIG. 20 is a front perspective view of another window planter according to aspects of the present disclosure.

Referring to FIG. 20, window planter 2000 includes a first elevated compartment 2011 supported above the second compartment 2004. The first elevated compartment 2011 is configured to house a fourth group of plants. A second elevated compartment 2012 is supported above the third compartment 2006. The second elevated compartment 2012 is configured to house a fifth group of plants. A first forward compartment 2013 is supported by the second compartment 2004. The first forward compartment 2013 is configured to house a sixth group of plants. A second forward compartment 2014 is supported by the third compartment 2006. The second forward compartment 2014 is configured to house a seventh group of plants.

Figure 22A:
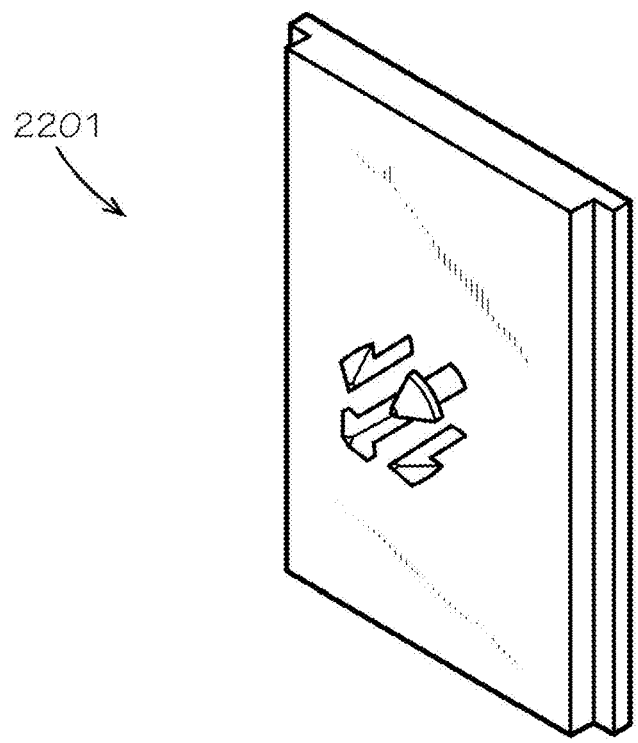
FIG. 22A illustrates an exemplary attachment bracket according to aspects of the present disclosure.

Each of the first elevated compartment 2011, second elevated compartment 2012, first forward compartment 2013, and second forward compartment 2014 can be removably secured to the window planter 2000. For example, an attachment bracket (see, e.g., bracket 2201 in FIG. 22A) can be used to slidably secure the first elevated compartment 2011, second elevated compartment 2012, first forward compartment 2013, and second forward compartment 2014 to window planter 2000.

In an aspect of the present disclosure, a first side compartment 2015 is supported by the first outer sidewall 2005 of the second compartment 2004. A second side compartment 2016 is supported by the second outer sidewall 2007 of the third compartment 2006. The first side compartment 2015 is configured to house an eight group of the plants. The second side compartment 2016 is configured to house a ninth group of plants.

The first lattice panel 2008 is a modular panel including multiple first lattice members 2017. The second lattice panel 2009 is also a modular panel including multiple second lattice members 2017. The modular configuration allows lattice panels of different shapes and sizes to be formed (e.g., to accommodate windows of different sizes and shapes).

Figure 28A:
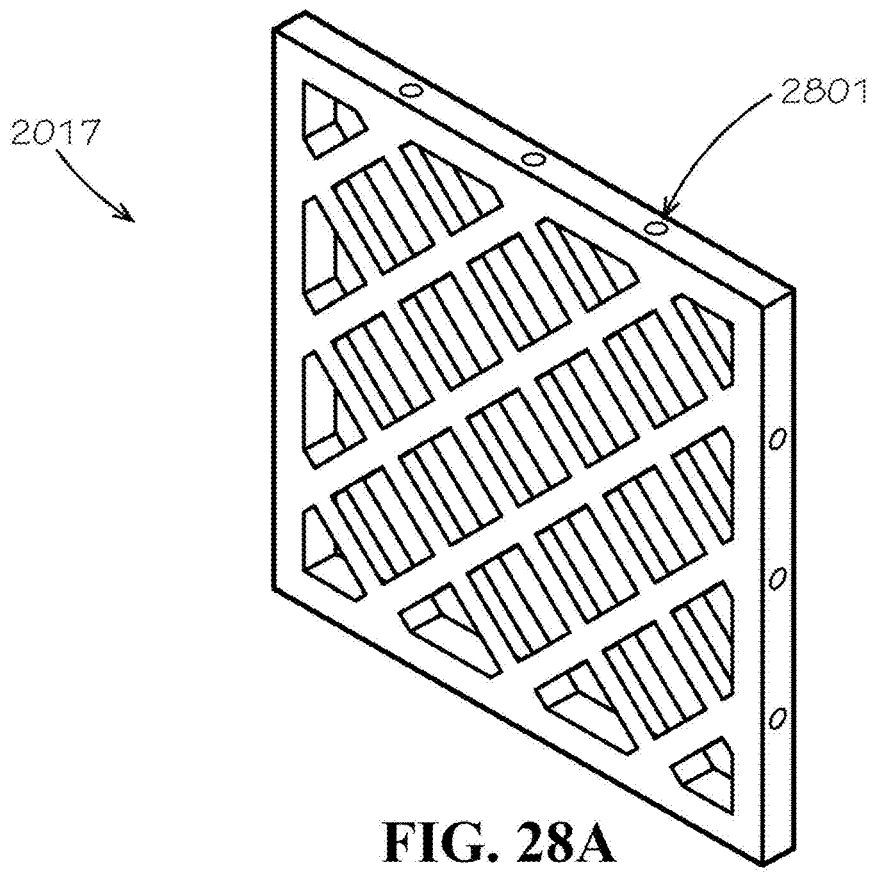
FIGS. 28A and 28B each illustrate a lattice member of a modular lattice panel of the window planters of FIG. 20 or 21 according to aspects of the present disclosure.
Figure 28B:
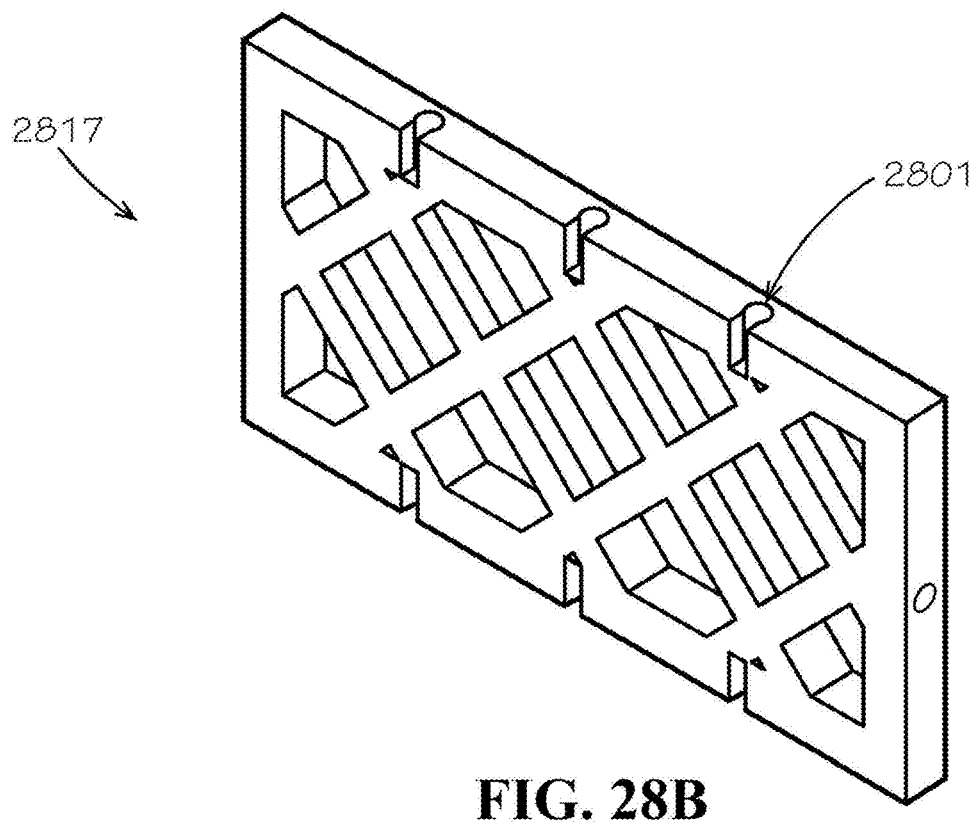
Figure 29A:
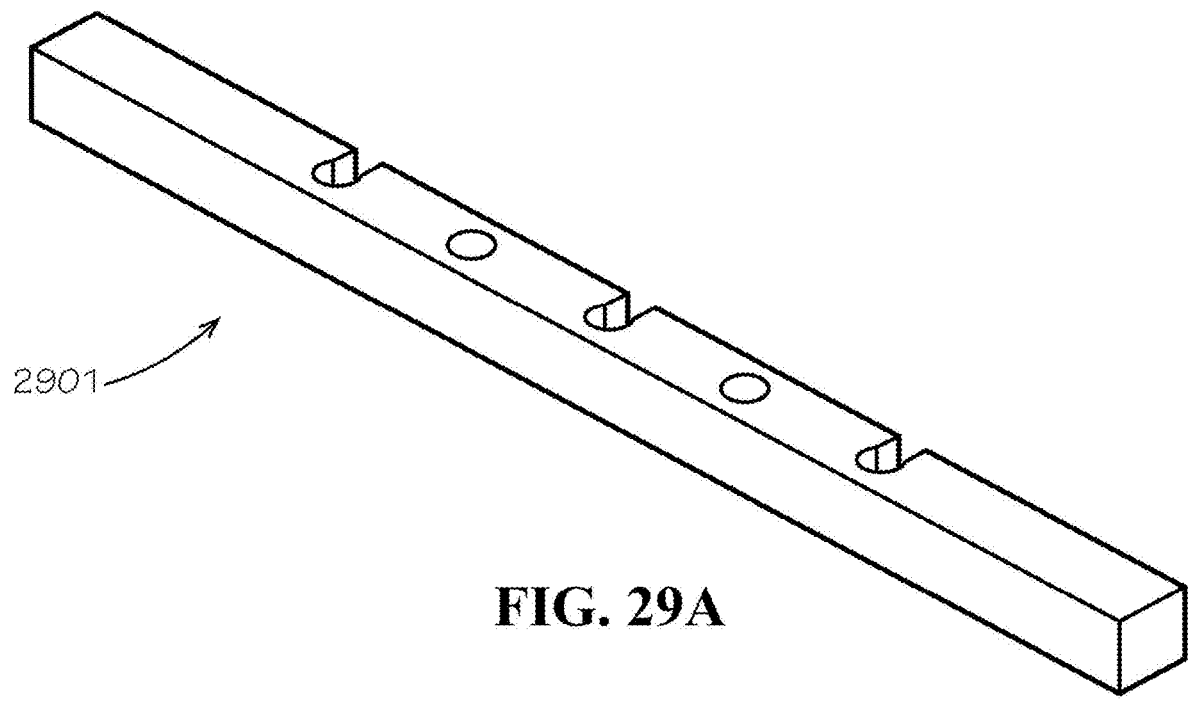
FIGS. 29A and 29B each illustrate a top member of the modular lattice panel of the window planters of FIG. 20 or 21 according to aspects of the present disclosure.
Figure 29B:
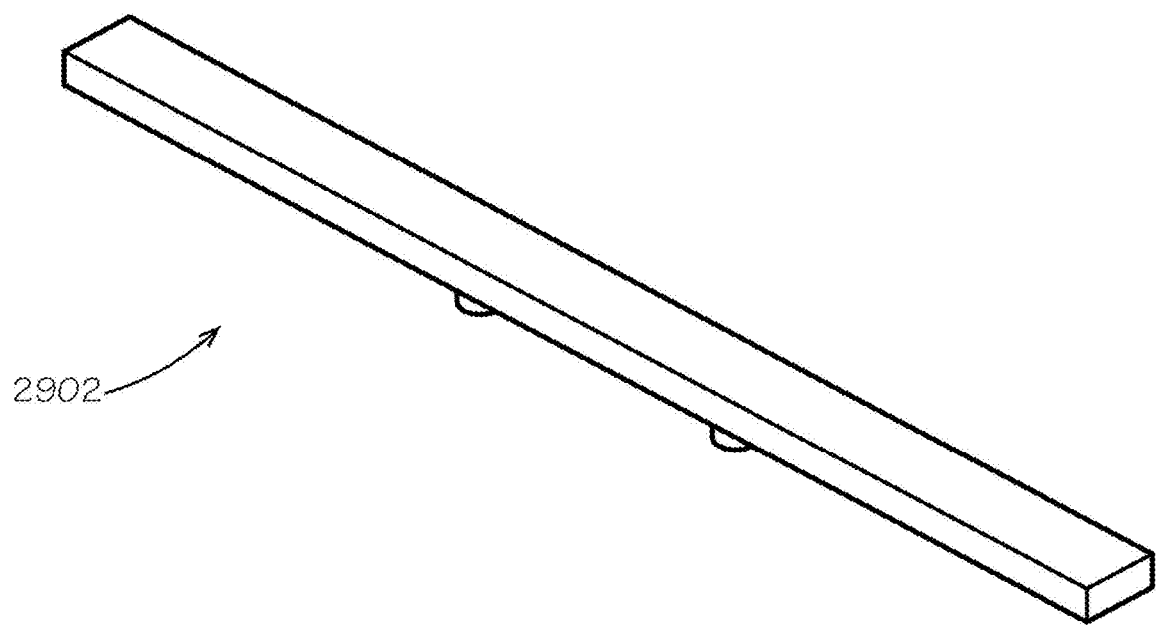
Figure 30:
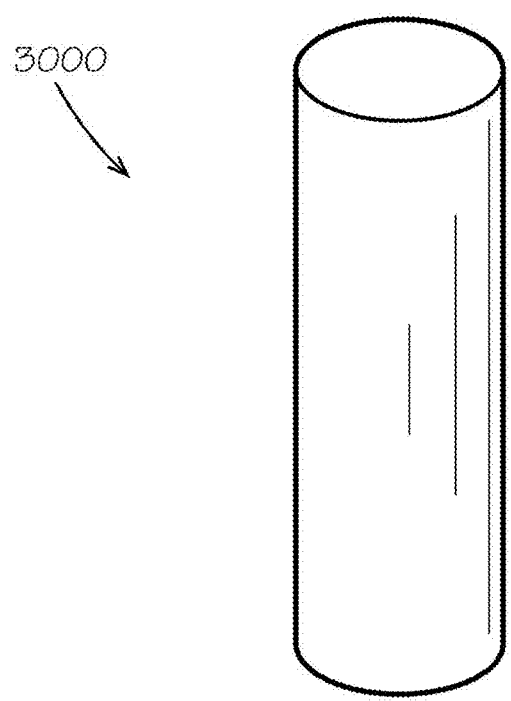
FIG. 30 illustrates an exemplary attachment pin for securing the lattice members of the module lattice panel of FIGS. 28A and 28B to each other.

The first or second lattice members may have, for example, a substantially square configuration (see, e.g., lattice panels 2017 in FIG. 28A) or a substantially rectangular configuration (see, e.g., lattice member 2817 in FIG. 28B).

Figure 21:
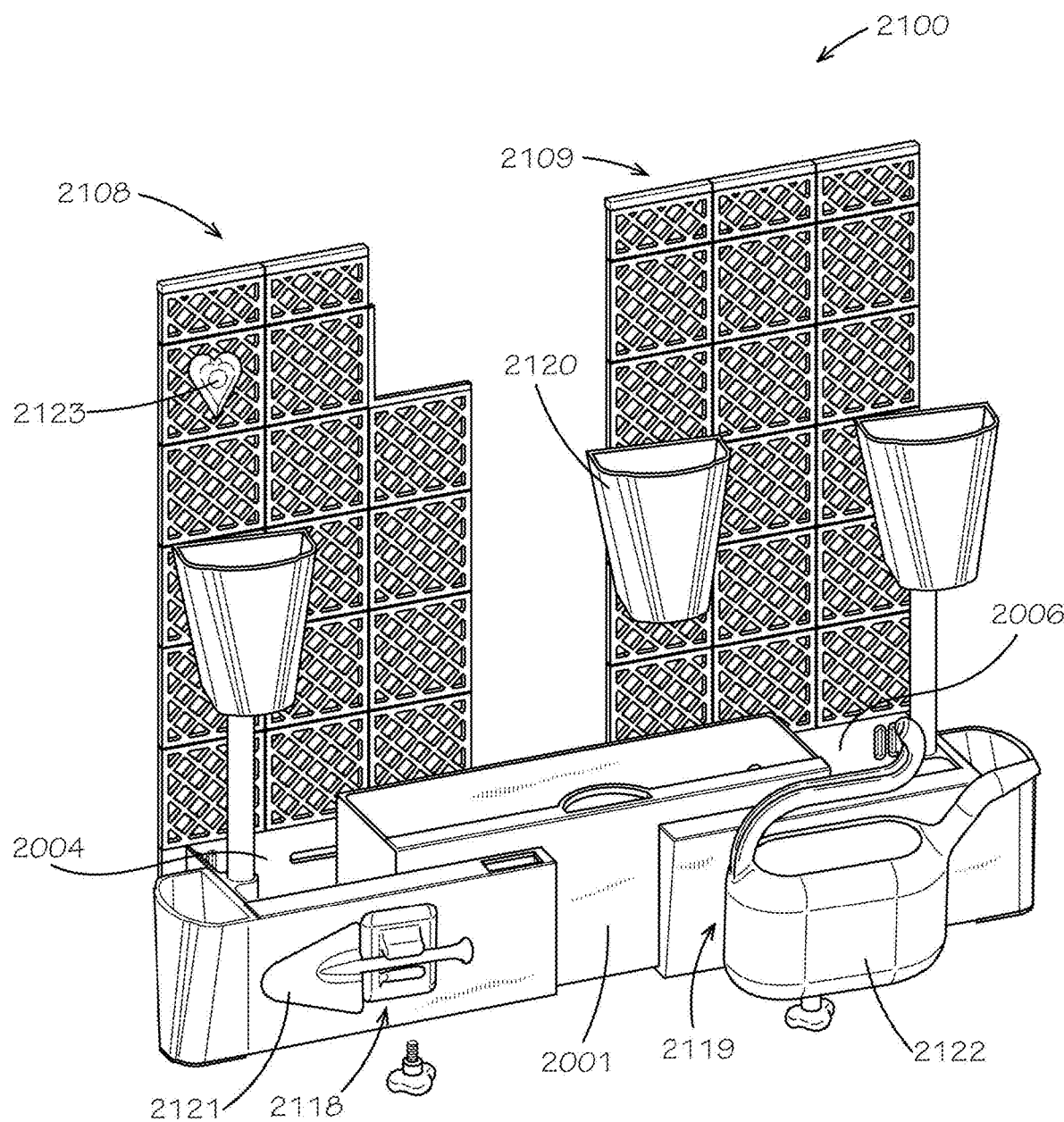
FIG. 21 is a front perspective view of another window planter according to aspects of the present disclosure.
Figure 22B:
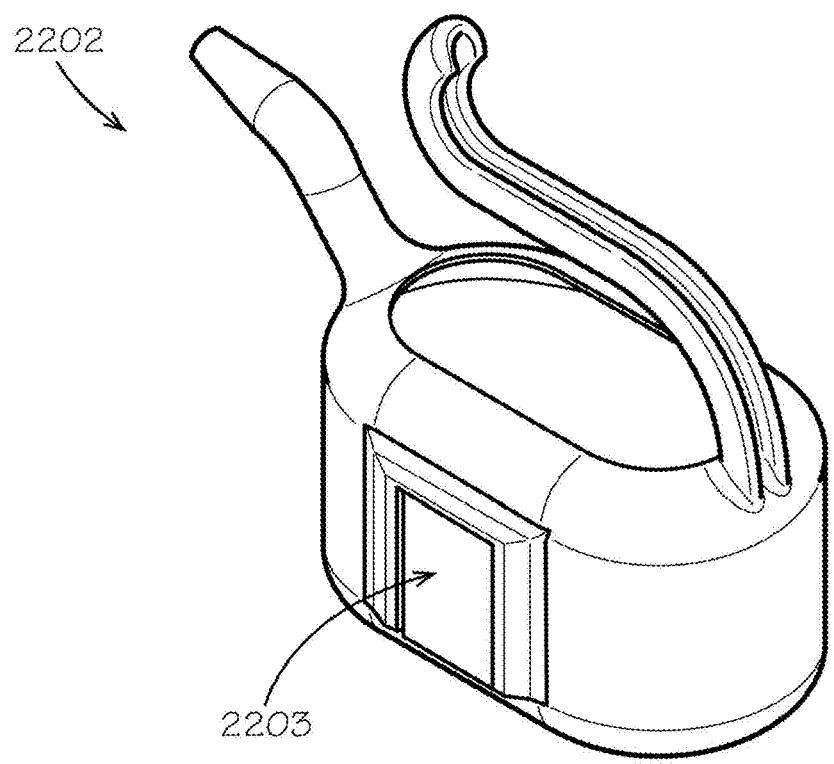
FIG. 22B illustrates an exemplary accessory that can be removably attached to the attachment bracket of FIG. 22A.
Figure 23A:
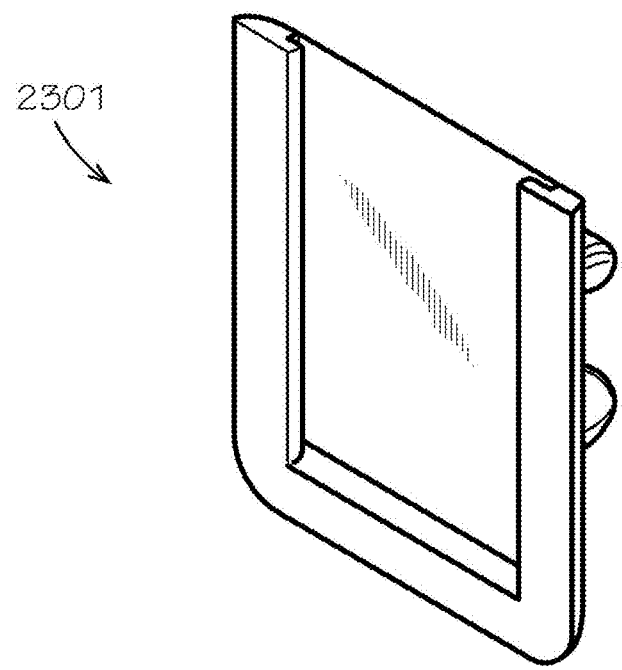
FIG. 23A is a rear perspective view of an accessory attachment bracket according to aspects of the present disclosure.
Figure 23B:
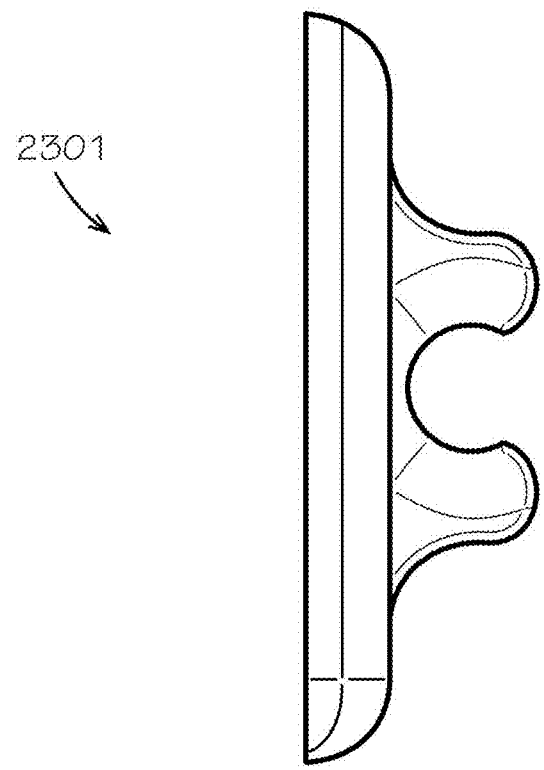
FIG. 23B is a top plan view of the accessory attachment bracket of FIG. 23A.
Figure 24:
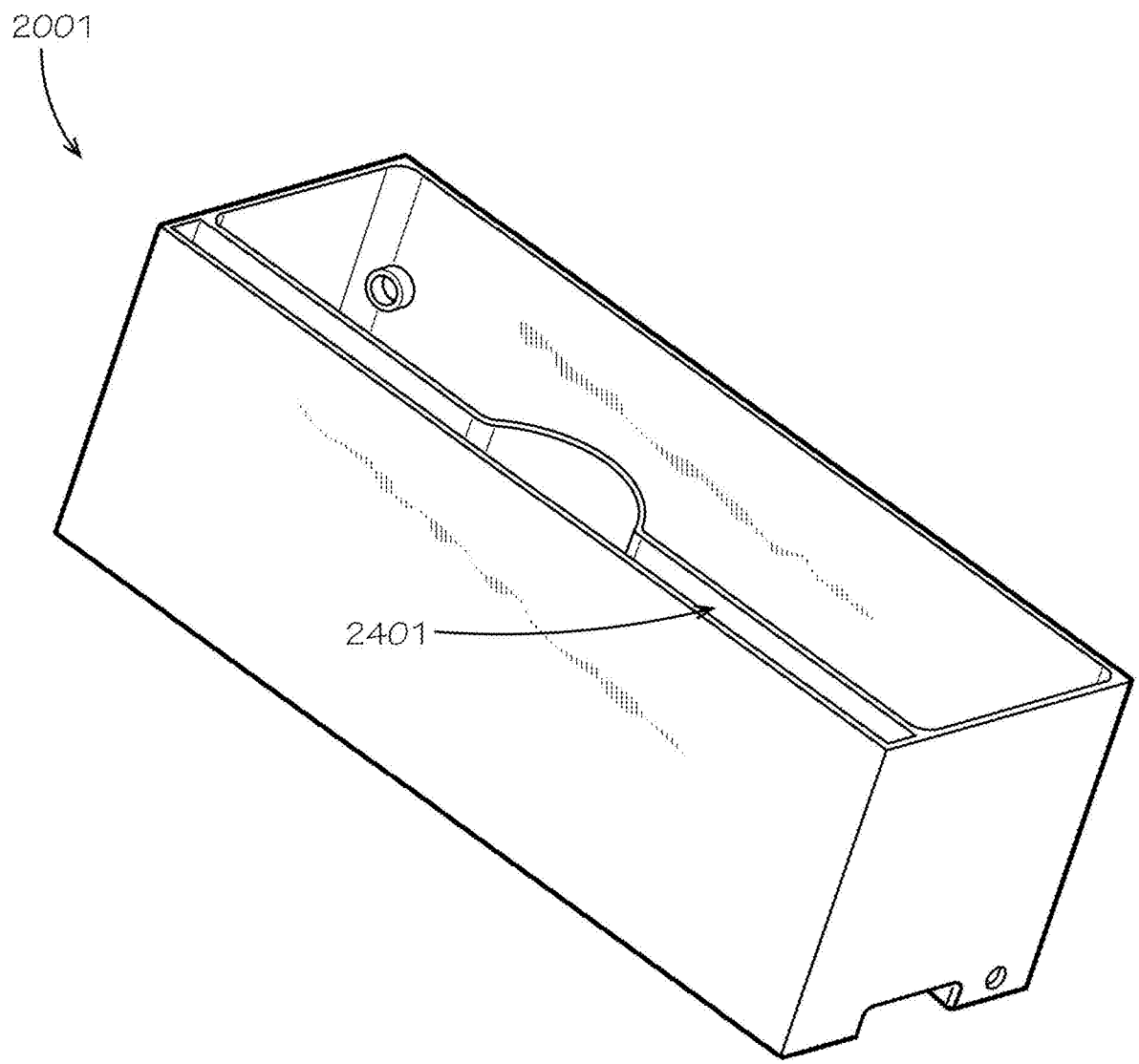
FIG. 24 is a front perspective view of a central compartment of the window planters of FIG. 20 or 21 according to aspects of the present disclosure.
Figure 25:
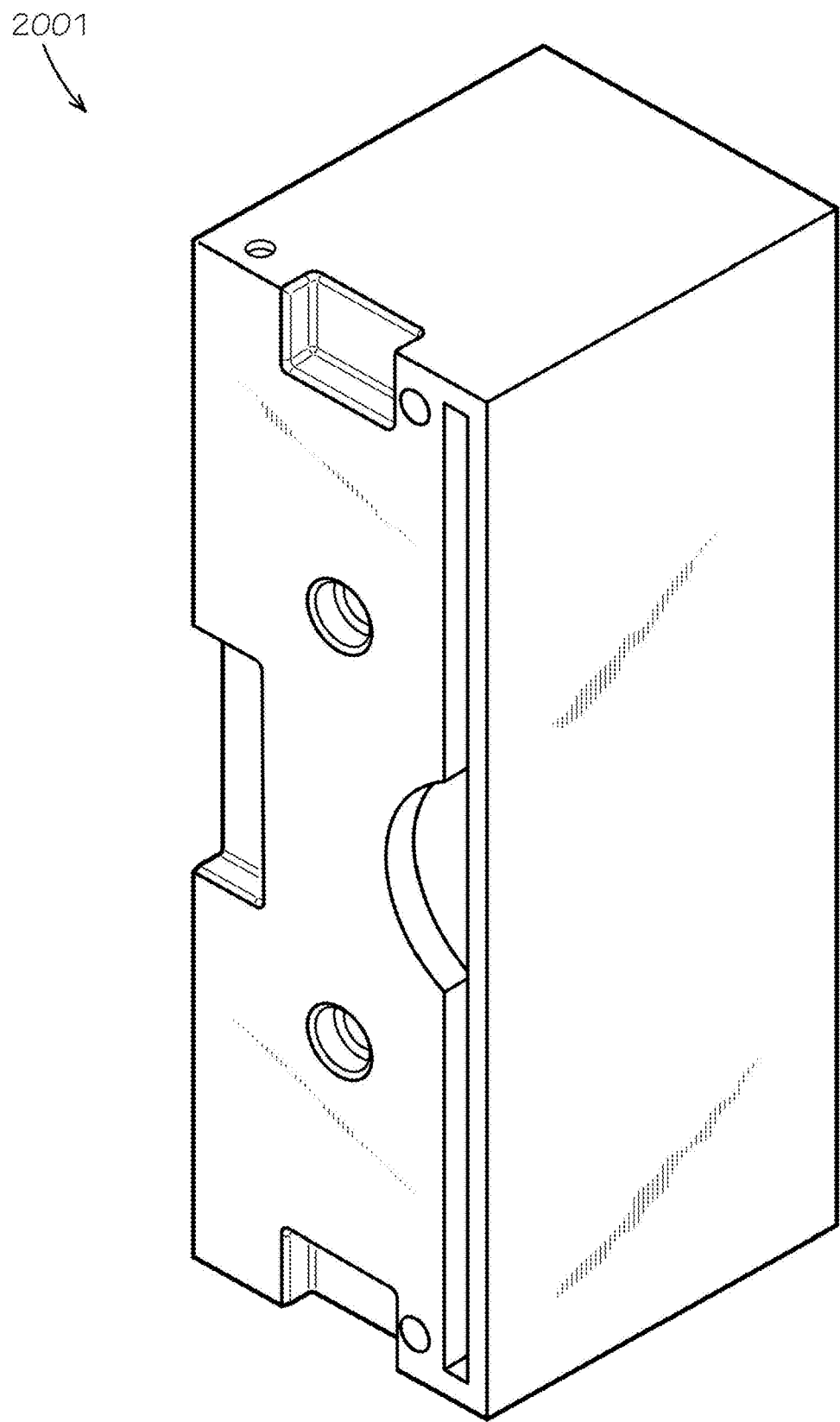
FIG. 25 is a bottom perspective view of the central compartment of FIG. 24.
Figure 26:
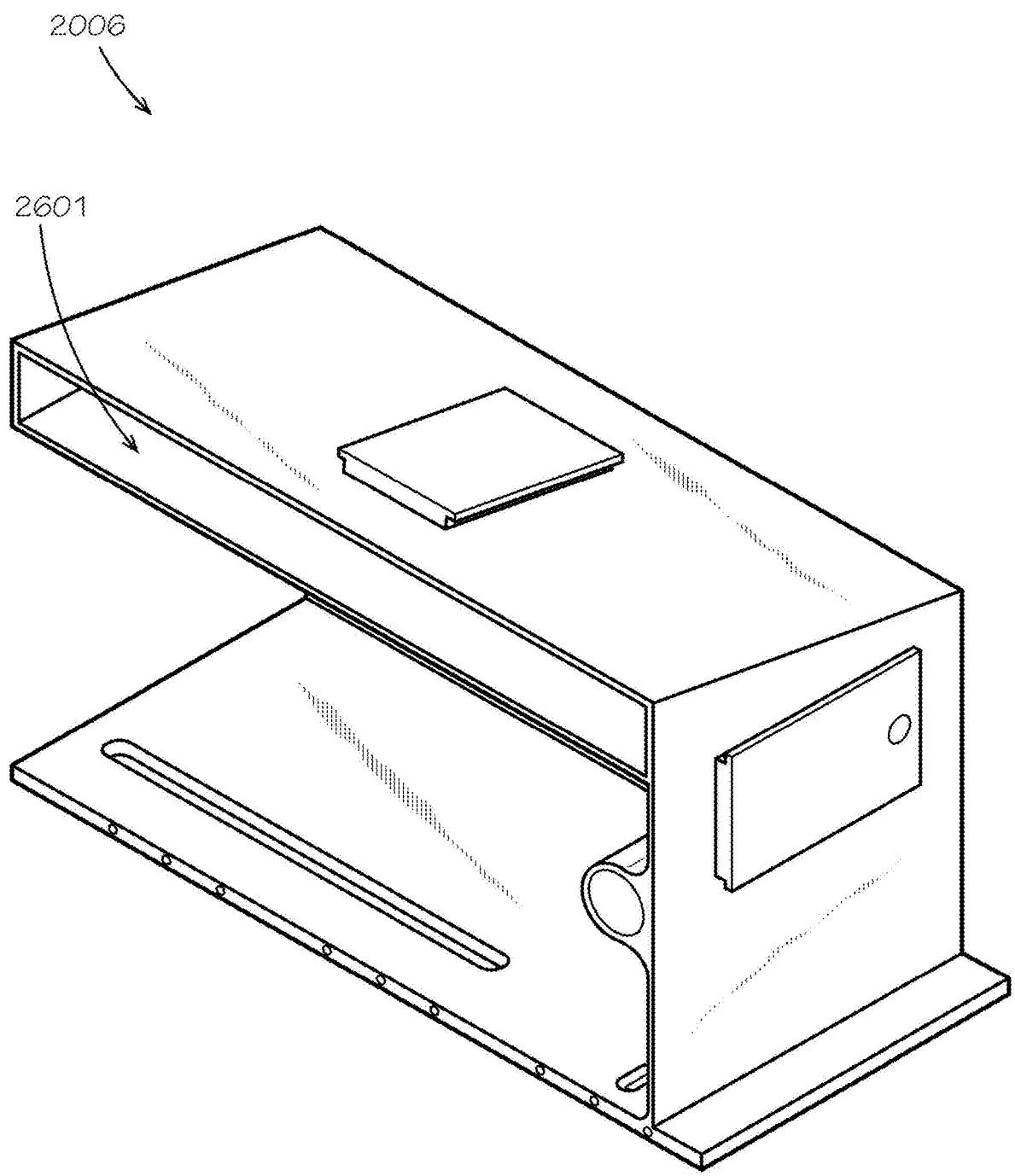
FIG. 26 is a top perspective view of a side compartment including front and side attachment brackets and slidably connectable with the central compartment of FIG. 24.
Figure 27:
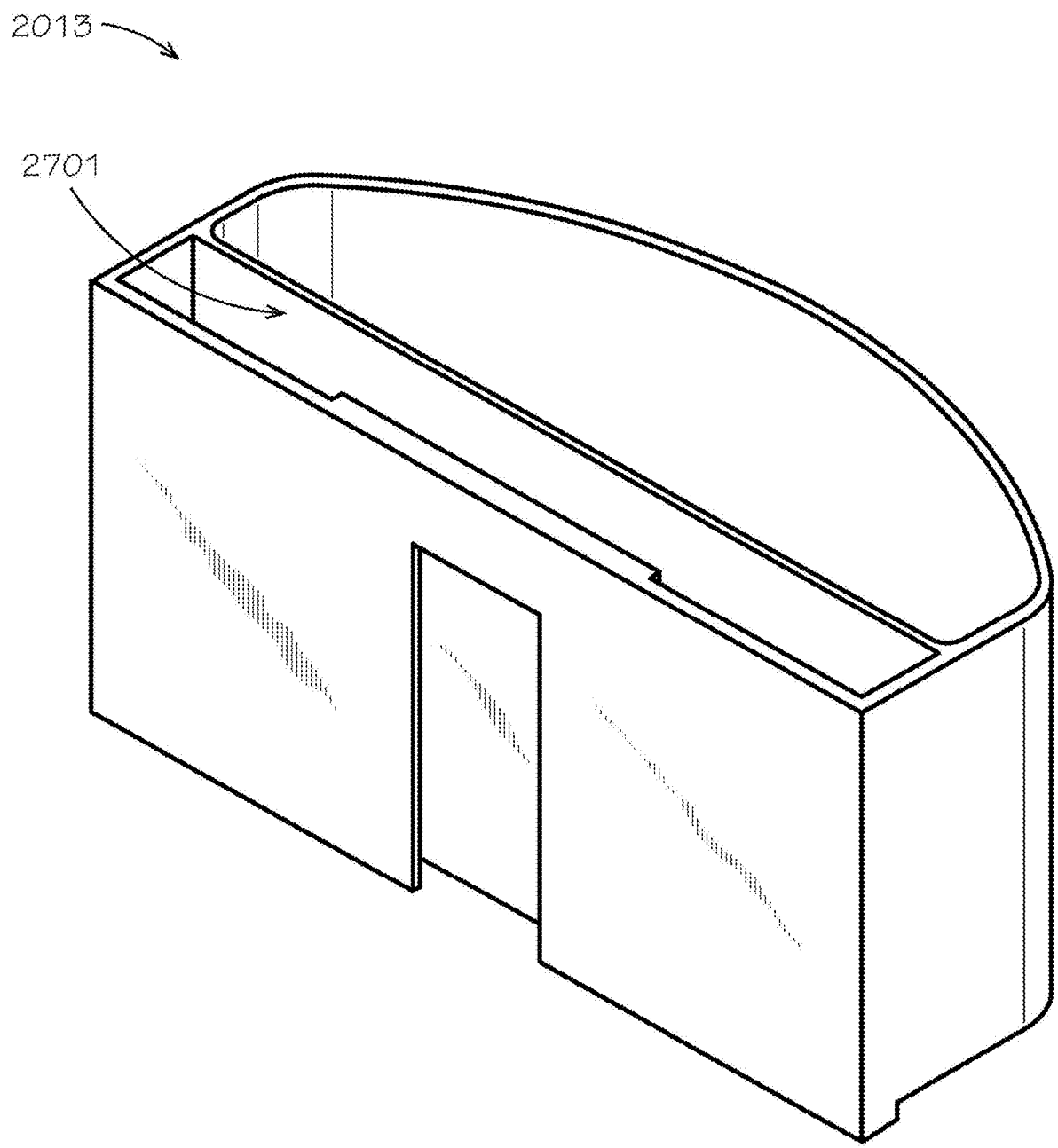
FIG. 27 is a rear perspective view of a front compartment including an attachment channel configured to mate with an attachment bracket of a side compartment of the window planters of FIG. 20 or 21 according to aspects of the present disclosure.

Referring to FIG. 21, first accessory attachment bracket 2118 is supported by the second compartment 2004. A second accessory attachment bracket 2119 may also be supported by the third compartment 2006. A first accessory 2121 (e.g., a shovel may be removably mounted to mounting bracket 2301 shown in FIGS. 23A and 23B) may be removably secured to the first accessory attachment bracket 2118 and a second accessory 2122 (e.g., a watering can shown in FIG. 22B with a slot 2203 configured to mate with one of mounting brackets 2201) may be removably coupled to the second accessory attachment brackets 2122.

In an aspect of the present disclosure, at least one floating compartment 2120 is removably coupled with the first lattice panel 2108 or the second lattice panel 2109. At least one decorative accessory 2123 may also be removably coupled with the first lattice panel 2108 or the second lattice panel 2109.

Referring to FIGS. 24-27, at least one of the first compartment 2001, second compartment 2004, the third compartment 2006, the first forward compartment 2013 or the second forward compartment 2014 includes a water reservoir (see, e.g., water reservoirs 2401, 2601 or 2701). The water reservoirs 2401, 2601 or 2701 may be substantially the same as the space 204 described above, and thus duplicative descriptions are omitted.

Referring to FIGS. 28A-30, the first lattice members (e.g., 2017 or 2817) each include first apertures 2801 and first pins 3000 disposed in the first apertures to secure the first lattice members to each other. The second lattice members each include substantially identical second apertures and second pins disposed in the second apertures to secure the second lattice members to each other.

In an aspect of the present disclosure, a top cap (e.g., 2901 or 2902) may be used to cap an upper end of the first or second lattice panels 2108 or 2109).

Various attachment mechanisms may be employed to attach a floating compartment, or any of the accessories described herein to a window planter, or to secure a lattice panel described herein to a window frame. For example, various hook and eye (e.g., Velcro® strips) may be employed as an attachment mechanism, as desired).

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A window planter, comprising:
a first compartment including a first sidewall and a second sidewall, the first compartment configured to house a first group of plants;
a second compartment slidably coupled to the first compartment, the second compartment including a first outer sidewall, the second compartment configured to house a second group of plants separated from the first group of plants by the first sidewall of the first compartment;
a third compartment slidably coupled to the first compartment, the third compartment including a second outer sidewall, the third compartment configured to house a third group of plants separated from the first group of plants by the second sidewall,
wherein at least the second compartment and the third compartment are configured to be secured to a window frame;
a first elevated compartment supported above the second compartment, the first elevated compartment configured to house a fourth group of plants;
a second elevated compartment supported above the third compartment, the second elevated compartment configured to house a fifth group of plants;
a first forward compartment supported by the second compartment, the first forward compartment configured to house a sixth group of plants; and
a second forward compartment supported by the third compartment, the second forward compartment configured to house a seventh group of plants.

2. The window planter of claim 1, further including a first side compartment supported by the first outer sidewall of the second compartment and a second side compartment supported by the second outer sidewall of the third compartment, the first side compartment configured to house an eight group of the plants, and the second side compartment configured to house a ninth group of plants.

3. The window planter of claim 1, further including a first lattice panel extending from the second compartment, and a second lattice panel extending from the third compartment.

4. The window planter of claim 3, wherein the first lattice panel is a first modular panel including a first plurality of lattice members, and wherein the second lattice panel is a second modular panel including a second plurality of lattice members.

5. The window planter of claim 4, wherein the first lattice members of the first plurality of lattice members each include a plurality of first apertures and a plurality of first pins disposed in the plurality of first apertures to secure the first lattice members of the first plurality of lattice members to each other, and wherein the second lattice members of the second plurality of lattice members each include a plurality of second apertures and a plurality of second pins disposed in the plurality of second apertures to secure the second lattice members of the second plurality of lattice members to each other.

6. The window planter of claim 3, wherein the first lattice panel includes a first overhang configured to be secured to the window frame, and wherein the second lattice panel includes a second overhang configured to be secured to the window frame.

7. The window planter of claim 6, wherein the first overhang and the second overhang are configured to be secured in a screen channel of the window frame.

8. The window planter of claim 7, wherein the first lattice panel includes a first attachment bracket at an upper end thereof, and wherein the second lattice panel includes a second attachment bracket at an upper end thereof, the first and second attachment brackets configured to secure the upper ends of the first and second lattice panels to the window frame, or to a window housed in the window frame.

9. The window planter of claim 1, wherein at least one of the second compartment, the third compartment, the first forward compartment or the second forward compartment includes a water reservoir.

10. The window planter to claim 1, further including a battery configured to be positioned in the first compartment.

11. The window planter of claim 10, further including at least one solar panel configured to charge the battery.

12. A window planter, comprising:
- a first compartment including a first sidewall and a second sidewall, the first compartment configured to house a first group of plants;
- a second compartment slidably coupled to the first compartment, the second compartment including a first outer sidewall, the second compartment configured to house a second group of plants separated from the first group of plants by the first sidewall of the first compartment;
- a third compartment slidably coupled to the first compartment, the third compartment including a second outer sidewall, the third compartment configured to house a third group of plants separated from the first group of plants by the second sidewall,
- wherein at least the second compartment and the third compartment are configured to be secured to a window frame;
- a first elevated compartment supported above the second compartment, the first elevated compartment configured to house a fourth group of plants;
- a second elevated compartment supported above the third compartment, the second elevated compartment configured to house a fifth group of plants;
- a first accessory attachment bracket supported by the second compartment; and
- a second accessory attachment bracket supported by the third compartment.

13. The window planter of claim 12, further including a first side compartment supported by the first outer sidewall of the second compartment and a second side compartment supported by the second outer sidewall of the third compartment, the first side compartment configured to house an eight group of the plants, and the second side compartment configured to house a ninth group of plants.

14. The window planter of claim 12, further including a first lattice panel extending from the second compartment, and a second lattice panel extending from the third compartment.

15. The window planter of claim 14, wherein the first lattice panel is a first modular panel including a first plurality of lattice members, and wherein the second lattice panel is a second modular panel including a second plurality of lattice members.

16. The window planter of claim 15, wherein the first lattice members of the first plurality of lattice members each include a plurality of first apertures and a plurality of first pins disposed in the plurality of first apertures to secure the first lattice members of the first plurality of lattice members to each other, and wherein the second lattice members of the second plurality of lattice members each include a plurality of second apertures and a plurality of second pins disposed in the plurality of second apertures to secure the second lattice members of the second plurality of lattice members to each other.

17. The window planter of claim 14, wherein the first lattice panel includes a first overhang configured to be secured to the window frame, and wherein the second lattice panel includes a second overhang configured to be secured to the window frame.

18. The window planter of claim 17, wherein the first overhang and the second overhang are configured to be secured in a screen channel of the window frame.

19. The window planter of claim 14, further including at least one floating compartment removably coupled with the first lattice panel or the second lattice panel, the at least one floating panel configured to house a sixth group of plants.

20. The window planter of claim 14, further including at least one decorative accessory removably coupled with the first lattice panel or the second lattice panel.

* * * * *